US011874941B2

(12) United States Patent
Leigh

(10) Patent No.: US 11,874,941 B2
(45) Date of Patent: *Jan. 16, 2024

(54) SYSTEMS AND METHODS OF SECURE NETWORKED DATA EXCHANGE

(71) Applicant: DataMover LLC, Bow, WA (US)

(72) Inventor: Nichole Portia Leigh, Shoreline, WA (US)

(73) Assignee: DataMover LLC, Bow, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/451,799

(22) Filed: Oct. 21, 2021

(65) Prior Publication Data
US 2022/0188441 A1 Jun. 16, 2022

Related U.S. Application Data

(63) Continuation of application No. 17/122,940, filed on Dec. 15, 2020, now Pat. No. 11,157,644.

(51) Int. Cl.
G06F 21/62 (2013.01)
G06F 16/9535 (2019.01)
(Continued)

(52) U.S. Cl.
CPC .......... *G06F 21/6218* (2013.01); *G06F 9/451* (2018.02); *G06F 16/116* (2019.01);
(Continued)

(58) Field of Classification Search
CPC .............. G06F 16/9535; G06F 16/116; G06F 21/6218; G06F 9/451; H04L 67/06; H04L 9/0869; H04L 63/0442; H04L 63/166
(Continued)

(56) References Cited

U.S. PATENT DOCUMENTS 7,861,158 B2 * 12/2010 Martin .................. G06F 8/51
717/104
11,157,644 B1 10/2021 Leigh
(Continued)

OTHER PUBLICATIONS

PCT International Serach Report and Written Opinion, regarding International Application No. PCT/US2021/063137, dated Mar. 31, 2022, 15 pages.
(Continued)

Primary Examiner — Hosain T Alam
Assistant Examiner — Saba Ahmed
(74) Attorney, Agent, or Firm — Knobbe, Martens, Olson & Bear LLP

(57) ABSTRACT

Systems and methods are disclosed comprising a data transfer and search facility adapted to access content, such as variables and cases, stored on a plurality of disparate computer content storage facilities. The variable data may comprise scientific data. The access of variables may be performed over an encrypted network. A user filter specification may be received and corresponding variables or cases may be identified using a search engine, the user may select which of the identified variables are to be transferred, and the variable data may be transferred from a source storage facility to a destination file. Missing variables values may be identified and a determination is made whether the identified number of missing variables values exceeds a threshold. Encoding of variable data is performed. The variable data may be provided to one or more statistical data analysis and processing applications.

28 Claims, 11 Drawing Sheets

(51) Int. Cl.
*G06F 9/451* (2018.01)
*H04L 67/06* (2022.01)
*G06F 16/11* (2019.01)
*H04L 9/40* (2022.01)
*H04L 9/08* (2006.01)

(52) U.S. Cl.
CPC .......... *G06F 16/9535* (2019.01); *H04L 67/06* (2013.01); *H04L 9/0869* (2013.01); *H04L 63/0442* (2013.01); *H04L 63/166* (2013.01)

(58) Field of Classification Search
USPC .......................................................... 726/27
See application file for complete search history.

(56) References Cited

U.S. PATENT DOCUMENTS

| | | |
|---|---|---|
| 2003/0200034 A1 | 10/2003 | Fellenberg et al. |
| 2006/0136290 A1 | 6/2006 | Fong |
| 2006/0173663 A1 | 8/2006 | Langheier et al. |
| 2007/0061303 A1* | 3/2007 | Ramer .................. G06F 16/951 |
| 2007/0208534 A1 | 9/2007 | Benfield et al. |
| 2008/0228442 A1 | 9/2008 | Lippincott et al. |
| 2010/0128306 A1* | 5/2010 | Han ...................... G06F 3/1285 |
| | | 358/1.15 |
| 2011/0071989 A1* | 3/2011 | Wilson ................ G06F 16/1748 |
| | | 707/E17.01 |
| 2014/0143375 A1* | 5/2014 | Walker ................... H04L 69/14 |
| | | 709/217 |
| 2016/0275269 A1 | 9/2016 | Buyse et al. |
| 2017/0177995 A1 | 6/2017 | Hillar et al. |
| 2017/0293764 A1* | 10/2017 | Hutton ................ H04L 63/1425 |
| 2017/0358079 A1 | 12/2017 | Gillies et al. |
| 2020/0110796 A1* | 4/2020 | Tsabba ...................... G06F 8/38 |

OTHER PUBLICATIONS

State/Transfer Data Conversion Software Utility—Benefits—5 pages, https://web.archive.org/web/20201024165647/https://stattransfer.com/overview/benefits/, dated Oct. 24, 2020.

State/Transfer Data Conversion Software Utility—Command Processor—6 pages, https://web.archive.org/web/20200926005739/https://stattransfer.com/overview/command/, dated Sep. 26, 2020.

State/Transfer Data Conversion Software Utility—Graphical User Interface—8 pages, https://web.archive.org/web/20201024165647/https://stattransfer.com/overview/interface/, dated Sep. 26, 2020.

State/Transfer Data Conversion Software Utility—Platforms—7 pages, https://wweb.archive.org/web/20201024165647/https://stattransfer.com/overview/platforms/ dated Sep. 26, 2020.

State/Transfer Data Conversion Software Utility—Program Generation—5 pages, https://web.archive.org/web/20201024165647/https://stattransfer.com/overview/program_generation/, dated Sep. 26, 2020.

State/Transfer Data Conversion Software Utility—Supported Formats—8 pages, https://web.archive.org/web/20201024165647/https://stattransfer.com/overview/formats/ dated Sep. 26, 2020.

* cited by examiner

FIG. 3C

SYSTEMS AND METHODS OF SECURE NETWORKED DATA EXCHANGE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND OF THE INVENTION

Field of the Invention

The present disclosure generally relates to methods and systems for securely accessing, processing, and transferring data amongst electronic sources and destinations and that enable data analysis.

Background

It has become increasingly important to share and utilize data from disparate sources in order to perform many technical tasks, such as modeling and statistical for scientific and medical purposes. However, the exchange and import of such data is conventionally insufficiently secure, and requires excessive network bandwidth and memory utilization. Further, a data consumer, such as a medical modeling system, may need to translate data from disparate sources while still maintaining the necessary data. Conventional systems fail to provide the accuracy, speed, or efficiency that are needed or desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to a data transfer and search facility adapted to access content, such as variables and cases, stored on a plurality of disparate computer content storage facilities. The variable data may comprise scientific data. The access of variables may be performed over an encrypted network. A user filter specification may be received and corresponding variables or cases may be identified using a search engine, the user may select which of the identified variables are to be transferred, and the variable data may be transferred from a source storage facility to a destination file. Missing variables values may be identified and a determination is made whether the identified number of missing variables values exceeds a threshold. Encoding of variable data is performed. The variable data may be provided to one or more statistical data analysis and processing applications.

An aspect of the present disclosure relates to a system configured to securely access content comprising variables from one or more computer content storage facilities, comprising: memory configured to store instructions; and one or more processors in communication with the memory, the one or more processors configured to execute the instructions to cause the system to: receive, via a user input file type user interface presented on a first display, a selection of an input file type from a first plurality of file types, the plurality of file types including at least a statistical analysis program file type, a spreadsheet program file type, and a portable document format (PDF); receive, via a file specification user interface presented on the first display, a file specification for a source file; receive, via a destination file type user interface presented on the first display a selection of a destination file type from a second plurality of file types, the plurality of file types including at least a statistical analysis program file type, a spreadsheet program file type, and/or a portable document format (PDF); receive, via a file specification user interface presented on a first display, a file specification for a destination file; receive a user-specified variable filter via a corresponding user interface; identify, using a search engine, variables in the source file satisfying the user-specified variable filter; receive, via an interface enabling the user to specify whether variables in the source file satisfying the user-specified variable filter are to be kept in a data transfer to the destination file, an instruction to keep variables in the source file satisfying the user-specified variable filter in a data transfer to the destination file; provide a user interface that enables the user to specify whether an optimization process of a target type is to be performed, wherein in response to the user instructing that the optimization process of a target type is to be performed, the system selects target types so as to reduce memory utilization without losing variable value information; at least partly in response to a user command to transfer data from the source file to the destination file and a user instruction to perform an optimization process of a target type, cause: variables in the source file satisfying the user-specified variable filter to be transferred to the destination file, wherein an optimization is performed on target types for one or more of the variables in the source file satisfying the user-specified variable filter being transferred to the destination file.

An aspect of the present disclosure relates to a computer-implemented method, the method comprising: receiving, via a user input device, a selection of an input file type from a first plurality of file types, the plurality of file types including at least a statistical analysis program file type, a spreadsheet program file type, and a portable document format (PDF); receiving, via the user device, a file specification for a source file; receiving, via the user device, a selection of a destination file type; receiving, via the user device, a file specification for a destination file; receiving a user-specified variable filter from via the user device; identifying variables in the source file satisfying the user-specified variable filter; receiving via an interface enabling the user to specify whether variables in the source file satisfying the user-specified variable filter are to be kept in a data transfer to the destination file, an instruction to keep variables in the source file satisfying the user-specified variable filter in a data transfer to the destination file; performing an optimization process that selects a target type for at least one variable configured to reduce memory utilization without losing variable value information; and transferring variables in the source file satisfying the user-specified variable filter to be transferred to the destination file in accordance with the optimization process.

An aspect of the present disclosure relates to a non-transitory computer readable medium having computer readable code stored thereon, the computer readable code, when executed by at least one processor, causing performance of operations comprising: receive a selection of an input file type from a first plurality of file types, the plurality of file types including at least a statistical analysis program file type, a spreadsheet program file type, and a portable document format (PDF); receive a file specification for a source file; receive a selection of a destination file type; receive a file specification for a destination file; receive via an interface enabling the user to specify whether variables in the source file are to be kept in a data transfer to the destination file, an instruction to keep user-specified variables in the source file in a data transfer to the destination file; perform an optimization process that selects a target type for at least one variable configured to reduce memory utilization without losing variable value information; and transfer user-specified variables in the source file to the destination file in accordance with the optimization process.

BRIEF DESCRIPTION OF THE DRAWINGS

Embodiments will now be described with reference to the drawings summarized below. These drawings and the associated description are provided to illustrate example aspects of the disclosure, and not to limit the scope of the invention.

FIGS. 3A-3H illustrate example user interfaces.

DETAILED DESCRIPTION

Figure 1A:
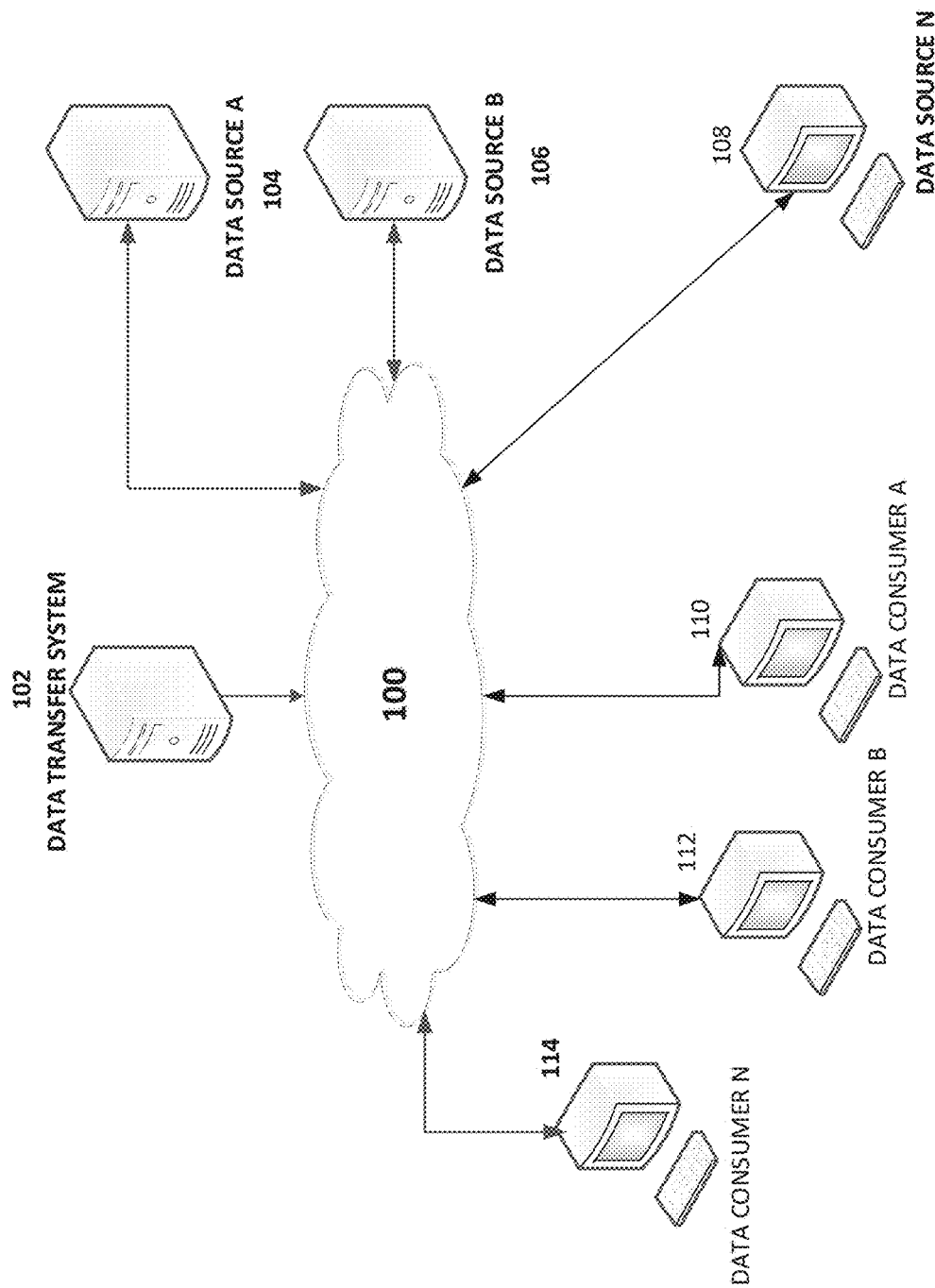
FIG. 1A is a block diagram illustrating an example embodiment of an operating environment.

An aspect of the present disclosure relates to systems and methods configured to securely and efficiently access data from disparate sources in disparate formats, and to covert such data into a format useable for desired purposes, such as for modeling and statistical analysis purposes, and to provide such converted data to destination systems and programs.

In particular, given the advances in electronic medical data and in science in general, there is an ever increasing need to efficiently, accurately, and effectively utilize such data for various purposes. For example, data may need to be moved from statistical programs, spreadsheets, databases, or other programs and data sources to other programs and data structures, such as other statistical analysis programs, spreadsheets, databases, or modeling programs.

Systems and methods are described herein that provide technical solutions to transferring data, such as statistical data (e.g., including values and variable labels) between multiple programs and data formats, including statistical programs, spreadsheets, databases, portable document formats, and modeling programs.

Data generated by one program may be needed in another context (e.g., by other programs) for analysis, for perfecting analysis, for refining analysis, and analysis correction, and/or for presentation. In certain contexts, such as the scientific (e.g., medical) field, there are important advantages in enabling researchers to share their data with others. For example, a researcher's data may be used by others to analyze issues and investigate scientific questions outside of the area that the original researcher was investigating, to analyze outcomes that the original researcher did not investigate, to apply new data analysis techniques, and/or for other purposes.

A technical challenge is presented when moving data sets for the foregoing purposes, as not only does data need to be moved from sources to destinations, but variables may need to be re-characterized for a given destination. For example, variables may need to be supplemented or association with additional information, such as variable names, missing values (e.g., a data value that is not stored for a variable in the observation of interest), value, and variable labels, and/or the like.

If missing variable values are not handled properly by a researcher, then the resulting analysis may lead in incorrect inferences regarding the source data. Due to improper handling, the result obtained by the researcher will differ from ones where the missing values are present. By way of example, the absence of data (missing variable values) reduces statistical power (e.g., the probability that a test will reject the null hypothesis when it is false), may cause bias in the estimation of parameters, and/or may reduce the representativeness of the sampled variable values. The foregoing negative impacts that may be caused by missing variable values may reduce the validity of the corresponding testing (e.g., trials of pharmaceuticals, medical procedures, etc.), and result in invalid conclusions.

Conventionally, it has been challenging to perform such processes without extensive human intervention, without error, and without using relatively large amounts of processing power, memory, and network bandwidth, especially when the data sets contain many variables.

An aspect of the present disclosure are systems and methods for enabling data to be transferred between systems and applications reliably (using a data storage format that conforms to the internal format of target files), quickly, without the need for any or extensive human intervention in mapping data and variables, all while reducing computer resource utilization.

By way of non-limiting illustration, the disclosed, systems, applications, and processes may be utilized to both import and export medical data, such as post-HIPAA data files to and from the one or more electronic medical health records system (e.g., the EPIC SYSTEMS electronic medical health records system). Thus, the disclosed systems, application, and methods may optionally be utilized with respect to clinical trials, data modelers, researchers, and/or other applications. Such functionality is particularly advantageous as access to large amounts of patient data has become ever more important for use by data modelers. Disadvantageously, many healthcare data sources store data within their own unique schemas, making reliable and reproducible research challenging. Further, conventional methods for transforming and loading healthcare data into data models is a labor-intensive process that can alter the semantics of the original data, thereby adversely affecting the output of such data models.

As will be described herein with respect to an aspect of the disclosed technology, user interfaces and processes are provided that enable a user to efficiently and accurately select cases and variables that a user wants to move, which results in flexible, high speed and accurate transfers. For example, a case may be objects in a data collection. A given case may have one or more attributes or qualities, referred to herein as variables. Further, as will be described, output data types may be efficiently and intelligently selected so as to reduce or minimize data storage utilization, while maintaining needed information.

Yet further, user filters may be defined to quickly identify variables and cases of interest in an input file to be moved to an output file, thereby reducing system resource utilization that would otherwise be employed to move data that is not of interest. Still further, missing values may be identified and an analysis may be performed to ensure that such missing values do not result in faulty utilization of transferred data. In addition, various built-in sampling functions may be provided that provide flexibility in performing sampling operations on input file variables.

The foregoing flexibility and accuracy may be enhanced via a user-specified command file configured to be executed by a system command processor to automatically, accurately and repeatedly reproduce data move operations. To yet further enhance efficiency, a user interface may be provided that enables a user to specify a fully automatic batch procedures to perform certain data transfer processes (e.g., for repetitive tasks). Optionally, such batch process may be scheduled during period of relatively low system and/or bandwidth loading (e.g., late at night or early morning, such as between 11 PM and 4 AM). Optionally, interfaces may be provided that enable a user to document tasks performed by the user.

It is understood, that while the terms "move" and "transfer" may be used, the data may be maintained in a source file after data is said to have been moved or transferred to a destination file. Thus, a move or transfer may be in the form of a data copying action.

The example data transfer software application (which may be referred to as an "application") may be hosted on one or more systems. For example, the data transfer application may be downloaded to a data source system and/or a data consumer system. The data transfer application may be hosted by a cloud-based system and the data transfer services may be offered as a SaaS (Software as a Service) service.

The system hosting the data transfer application accesses data (e.g., statistical data) from a data set source whose data is to be shared with a data consumer in the internal format of the source files, and initially stores some or all of the numerical variable values in such accessed data as double precision floating point numbers to thereby preserve the numerical accuracy of such variable numerical values. The variable values may later (or concurrently) be stored using an assigned variable type format.

In order to reduce memory and network utilization, the numeric variable may be stored using a data storage type dynamically and intelligently selected so as to reduce or minimize the size of output data. For example, optionally the data storage type may optionally be selected so as the storage type is only as large as needed to preserve input precision of numerical data without excluding data and so as to conform to the internal format of target files of the data consumer. Further, the system may automatically process missing values if so enabled by a user.

By way of non-limiting example, the system more support the import and export of data using some of all of the following data formats and/or other data formats (optionally including variable-level metadata and/or file-level metadata for reading and writing): ACCESS, EXCEL, MATLAB, MINESET, MINITAB, OPENDOCUMENT SS, R, SAS, SPSS, STATA, STATISTICA, SYSTAT, EPIC, PDF. Notably, conventional systems fail to provide such data format flexibility for the import and export of data. For example, unlike conventional systems with respect to in statistical dataset transfer modeling transfers, the disclosed system, application, and processes optionally support the transfer to and/or from PDF files in statistical dataset transfer modeling transfers. Further, when the data source includes personally identifying information (e.g., related to medical histories, treatment, etc., or related to financial or other transactions), such personally identifying information may be excluded or stripped out from the transfer, thereby preserving the privacy and anonymity or the people or entities associated with such data.

The system and application may support a variety of different operating systems, including various versions of MICROSOFT WINDOWS, APPLE MACIOS, APPLE IOS, UNIX, LINUX, and/or other operating systems.

The data transfer may be configured to provide easy to use user interfaces, efficiently displaying controls and data, and that enables efficient navigation to the different functionalities and data using relatively less navigational operations than conventional systems.

For example, a given user interface may include different tabs corresponding to different sets of functionalities. Thus, for example, to access a given functionality, the user may select a corresponding tab, rather than having to navigate through multiple drop down menus to find a desired function.

For example, the data transfer user interfaces may include some or all of the following tab-accessible functions: a move all ("mover") function, a move selected variables function, a filtering function, a settings function, a command function, a user log function, and an activation function.

The move all function user interface (which may be selected via a "mover" tab) may be utilized in order to move all of the variables and cases in a given source file, using pre-specified default output types. Thus, in order to simplify such transfer, a user may need only specify the input file name and the output file name, without having to select variables or cases to be transferred and without having to specify output types.

The "move selected variables" function user interface (which may be selected via a "variables" tab) enables the user to select which variables are to be transferred from a specified source file to a output/destination file (thereby reducing the bandwidth and memory that would otherwise be needed to transfer and store the unneeded variables). In addition, the variables function user interface may also enable the user to instruct that the formats of variables are to be converted to a specified format (such as one or more of the formats discussed herein).

The filtering function user interface (which may be selected via a "filtering" tab) enables a user to select cases to be moved from a specified source file to a output/destination file (thereby reducing the bandwidth and memory that would otherwise be needed to transfer and store the unneeded cases).

The settings function user interface (which may be selected via a "settings" tab) enables the user to modify various settings (e.g., general settings, encoding settings, etc.) as needed to transfer statistical data between different programs.

Figure 3A:
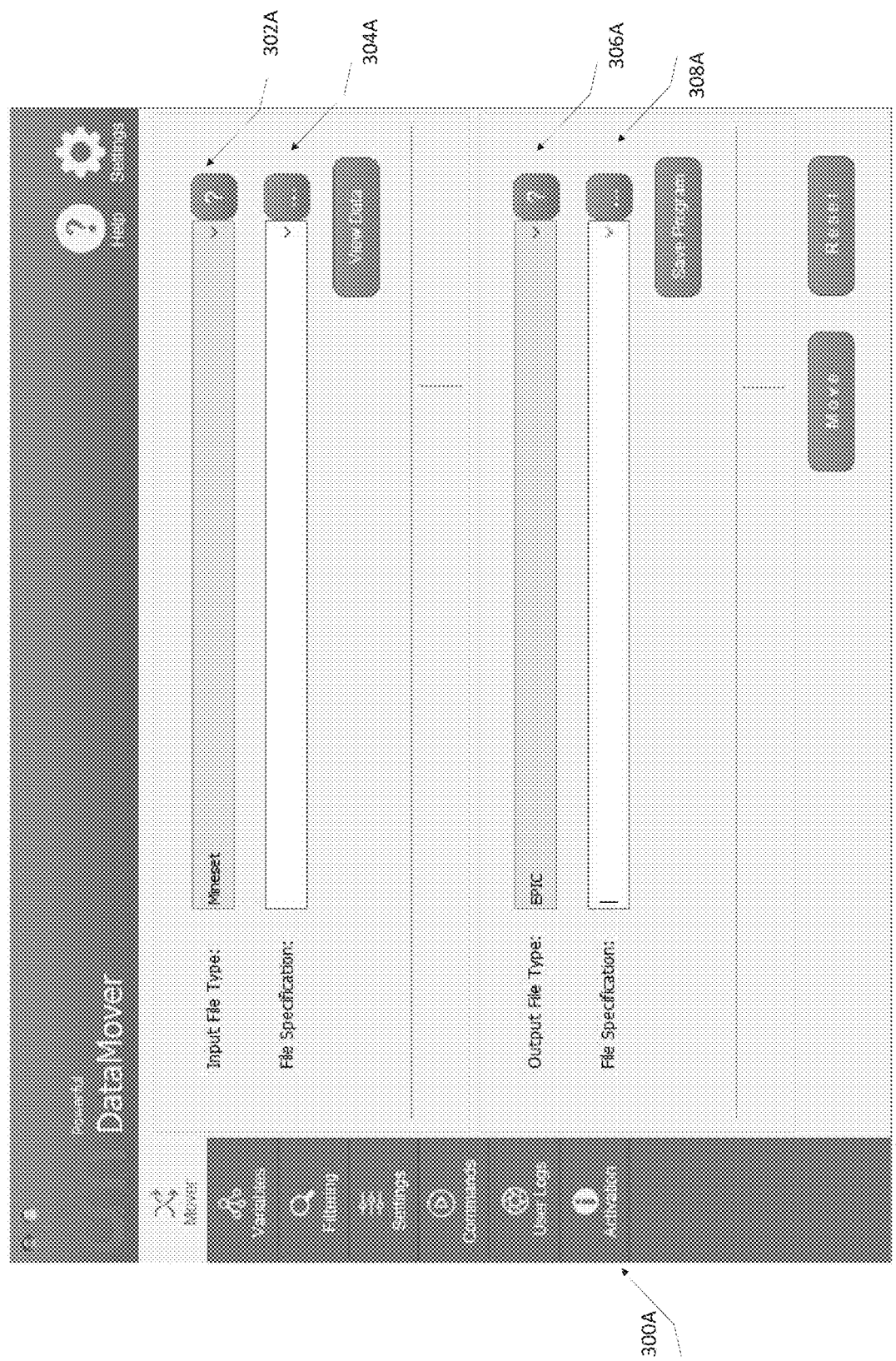
Figure 3B:
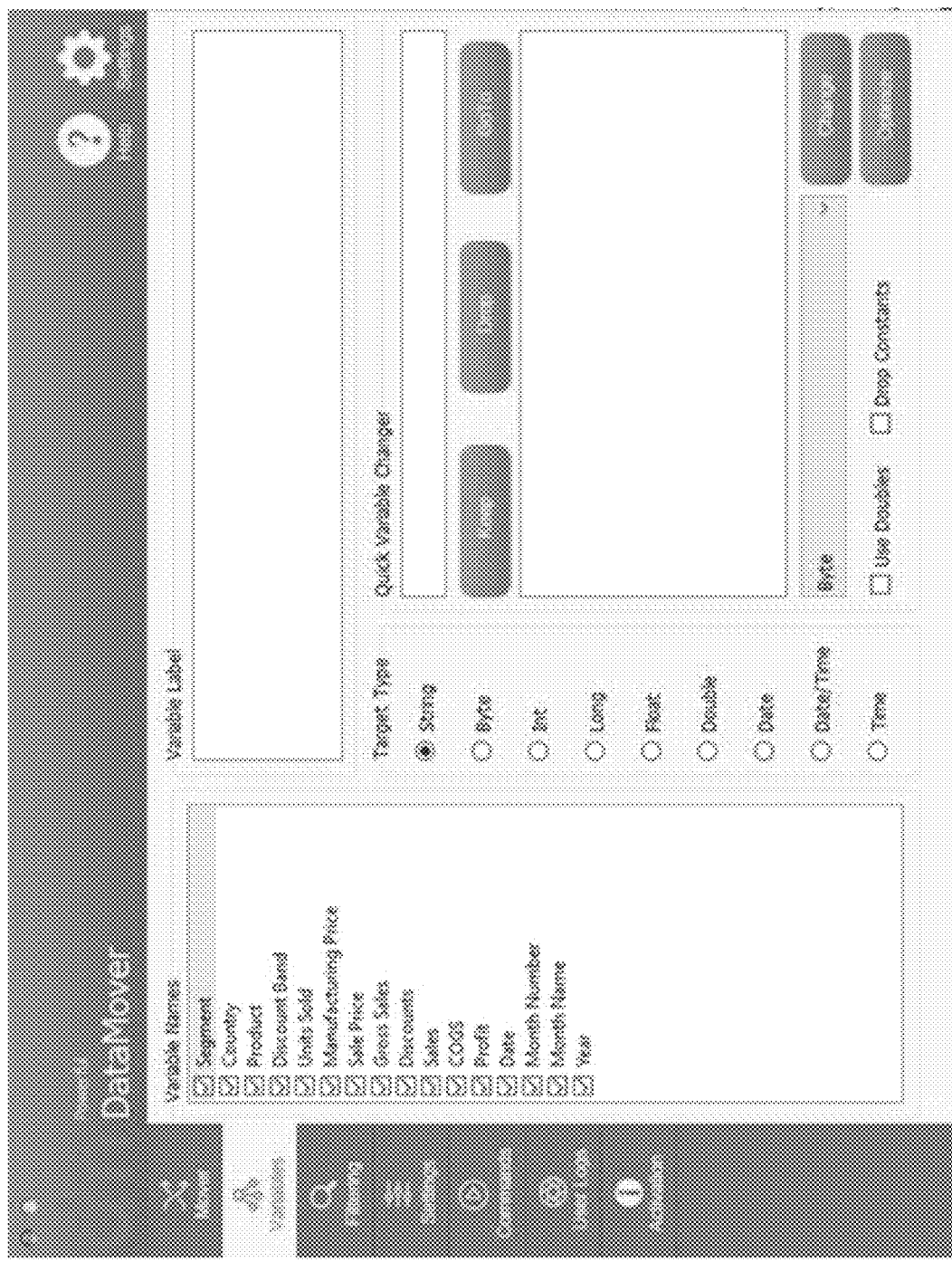

The commands function user interface (which may be selected via a "commands" tab) enables the user to define and schedule fully automatic, batch procedures for certain recurring tasks. For example, the commands user interface enables the user load, edit and run a command processor program directly, thereby reducing the amount of user interaction with the system in order to perform tasks (and hence reducing the amount of computer resources that would otherwise be needed to process such user interactions). An example of the commands function user interface is illustrated in FIG. 3E. A field is provided that displays the content of a selected command file, and a field is provided that provides the results of the command file execution.

The user logs user interface (which may be selected via a "user logs" tab) enables a user to enable a user log to be maintained and shared (e.g., with technical support personnel to respond to detected errors). For example, the data transfer application may log error, progress, and/or status messages generated during a data transfer process in a log file. The log file may be transmitted to technical support personnel (e.g., for error or issue resolution in the event an error or issue arises) in response to a user command or automatically when an error or issue is detected by the data transfer application.

Figure 3C:
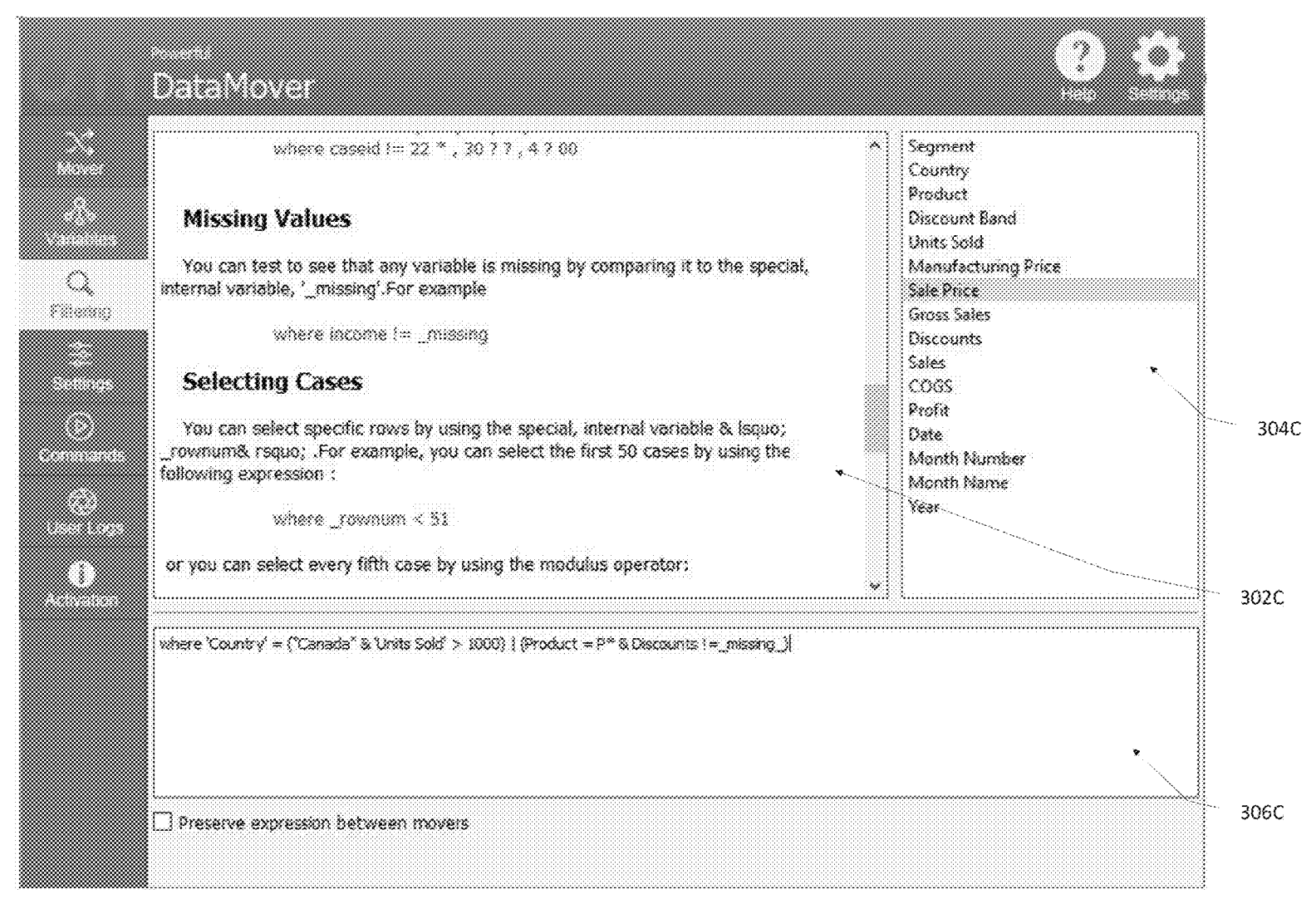
Figure 3D:
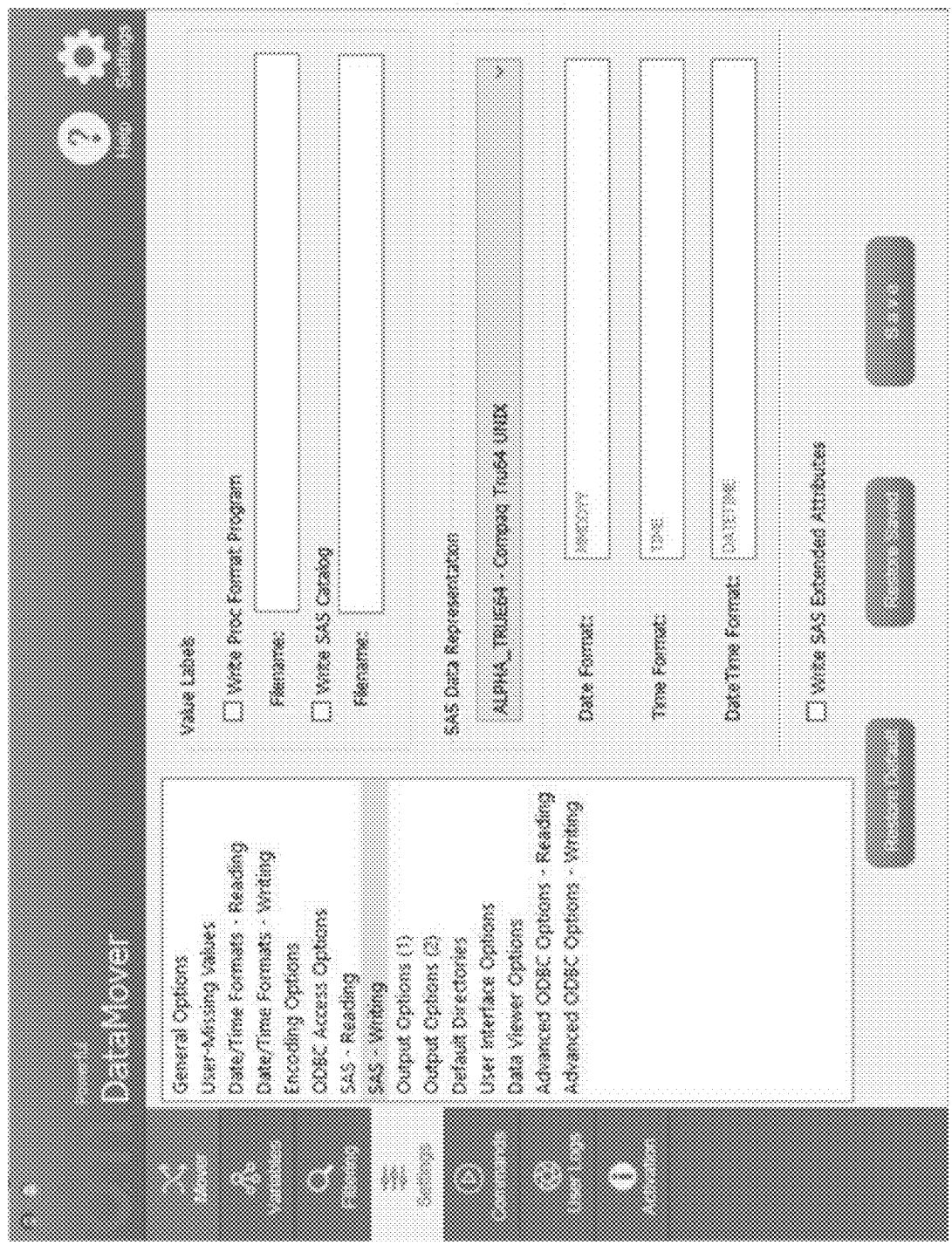
Figure 3E:
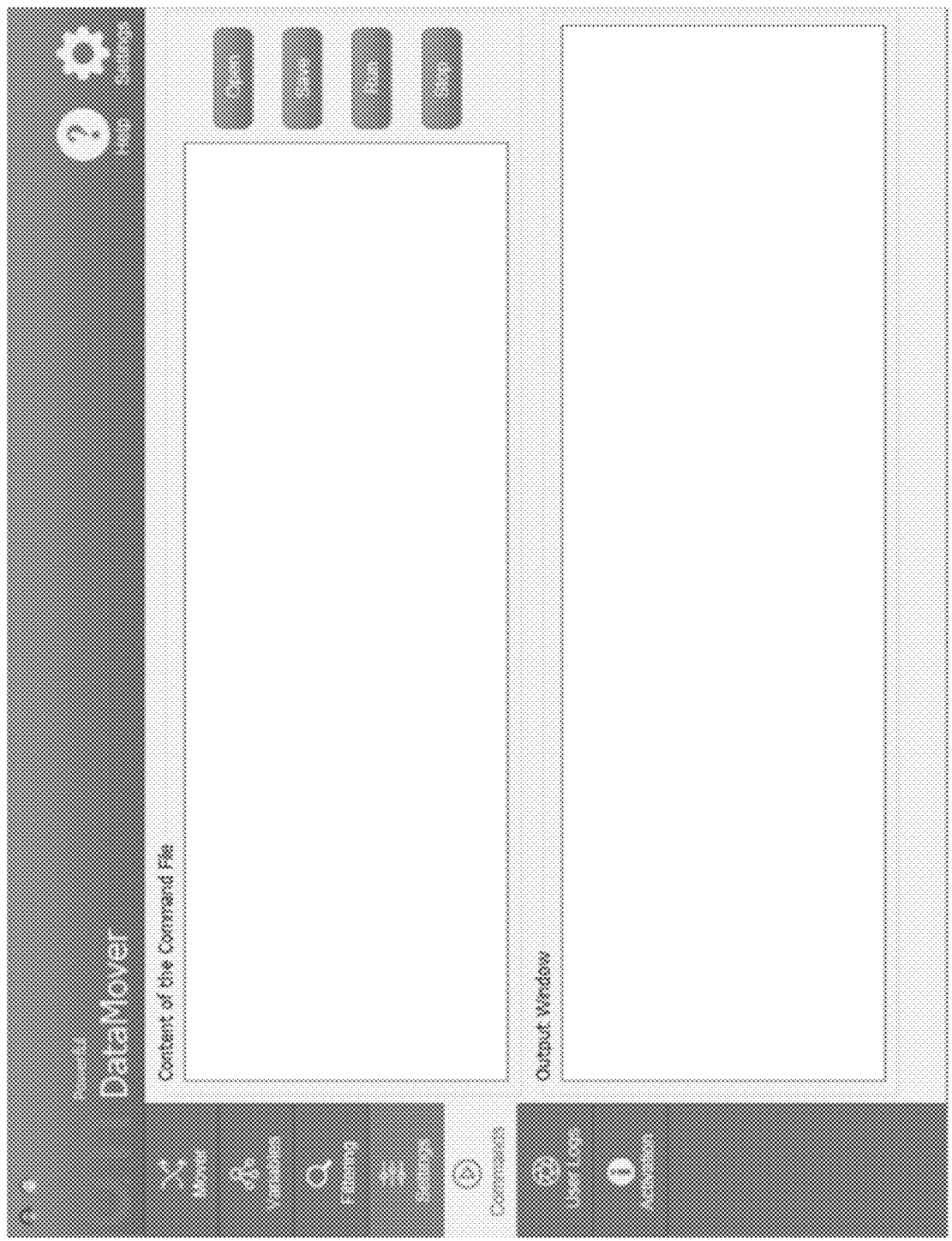
Figure 3F:
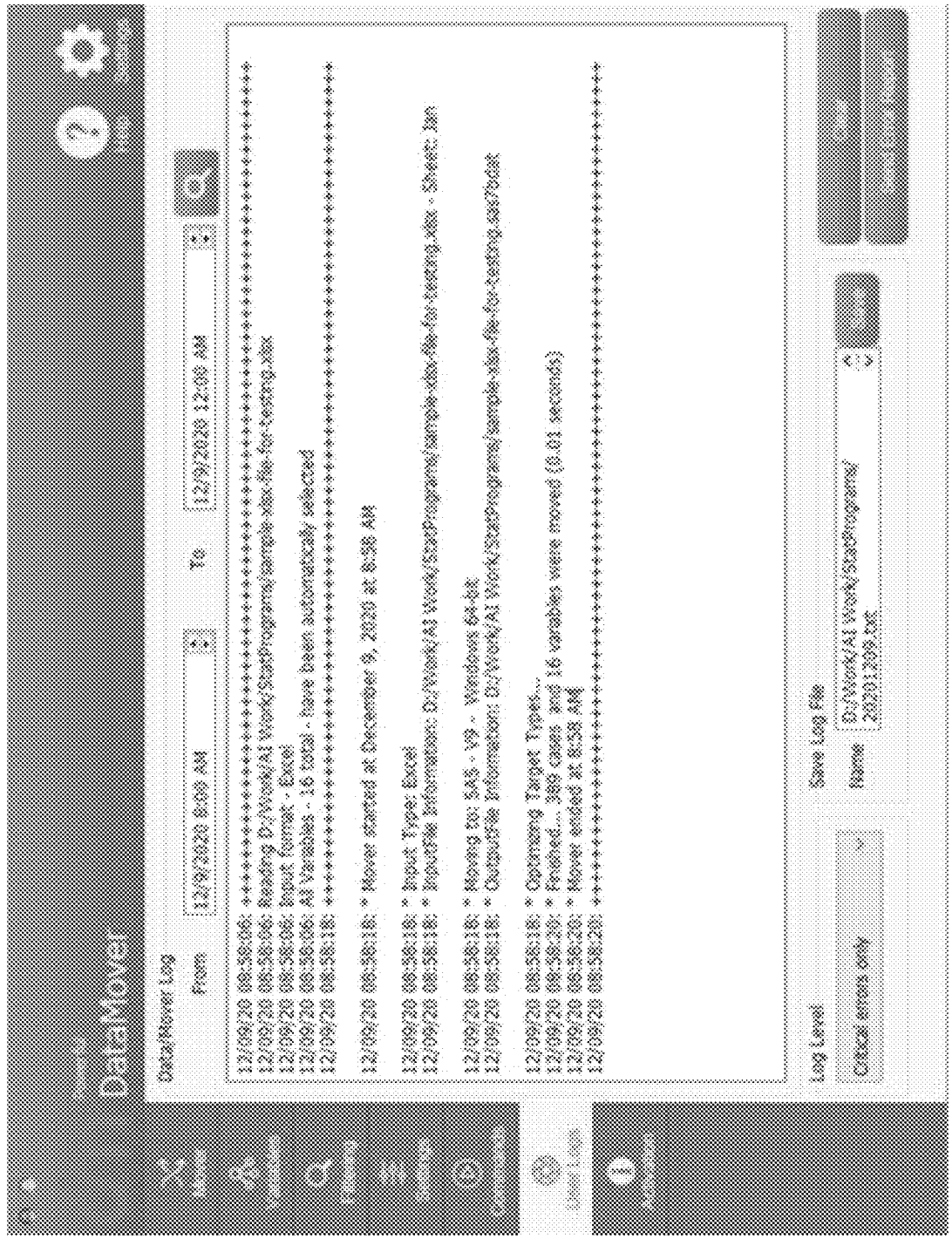

An example of the logs user interface is illustrated in FIG. 3F. Fields are provided via which the user can specify a log start and end date. A log field displays the actual event log, including the date and time of the logged event(s). For example, the log may list, for a given move operation, the time the data move started, the input type, input file information (e.g., the file path, the sheet number, page number, table name, etc.), destination information (e.g., file format), output file destination (e.g., the destination file path), whether optimization was performed, when the move was completed, how many cases were moved, how many variables were moved, how long the move took, and/or other information. A log level interface may be provided that enables the user to specify what types of events should be logged (e.g., all events, all errors, critical errors only, etc.). A log file path indicating where the log file is to be stored may be specified via a corresponding field. A control may be provided via which the user can command the system to transmit the log file (or a link thereto) to one or more specified destinations.

Figure 3G:
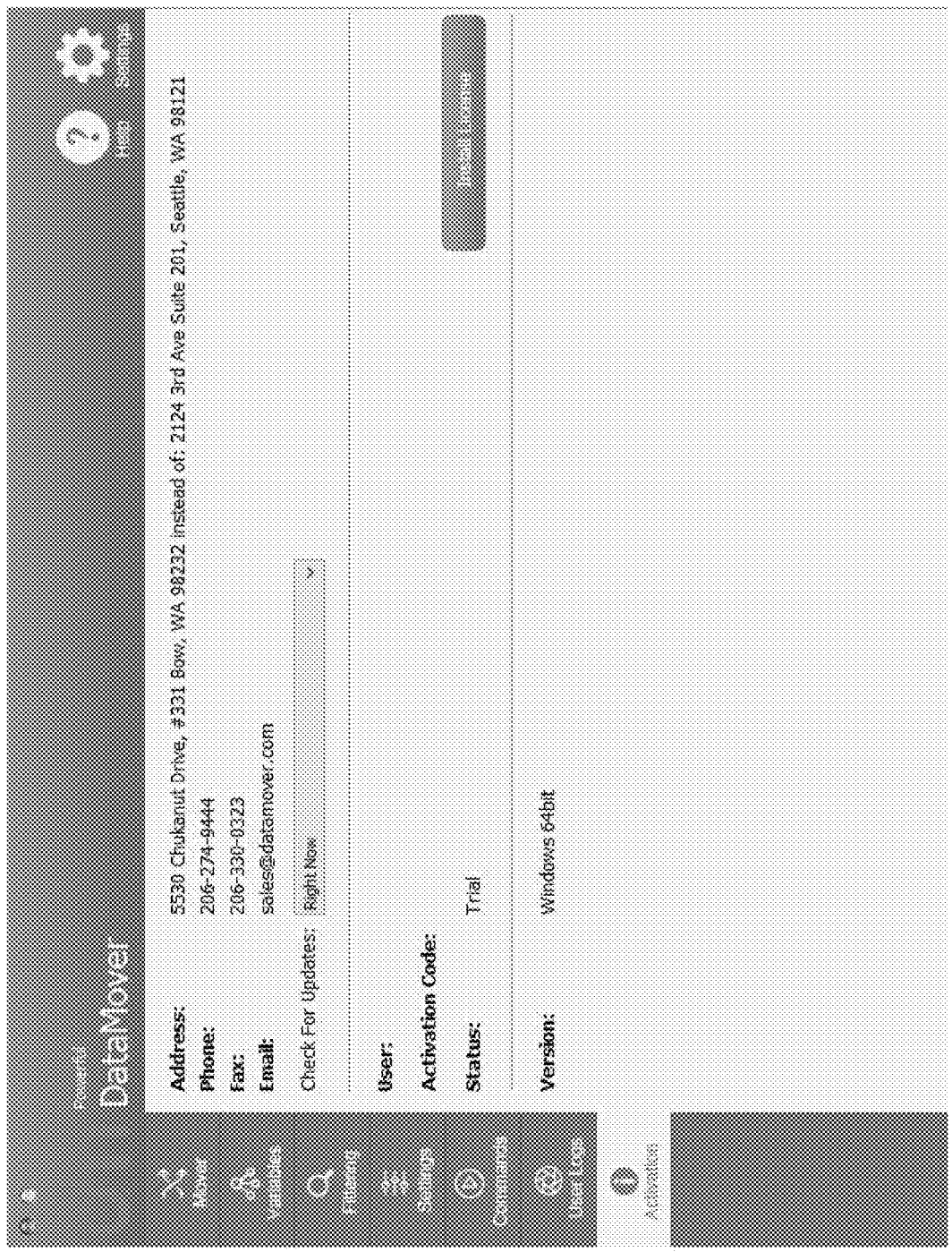

The activation user interface (which may be selected via an "activation" tab) enables a user to activate a downloaded data transfer application and/or a data transfer account. In addition, the activation user interface may enable the user to communicate with the provider of the data transfer application (e.g., for activation support, technical support, or for other reasons). For example, a text chat interface may be provided for such communication, an email address may be provided, and/or a phone number may be provided for such communication. An example activation user interface is illustrated in FIG. 3G.

An example system architecture that may be utilized to perform data transfer services (including format conversions, missing variables management, variable filtering, variable sampling, and other services described hereunder) will now be discussed with reference to FIG. 1A. The various systems and devices may communicate with each other over one or wired and/or wireless networks 100 (e.g., the Internet, Ethernet, or other wide area or local area network). In the illustrated embodiment, a data transfer system 102 may be hosted on one or more servers. The data transfer system 102 may be cloud-based and may be accessed by one or more data consumer systems 110, 112 over the network 100. Data consumer computer systems 110, 112, 114 and data source computer systems 104, 106, 108 may be able to share software applications, computing resources, and data storage provided by the data transfer system 102. Optionally, the data transfer functionality provided by the data transfer system 102 may in addition or instead be performed by instantiation of a data transfer application hosted on one or more of the data consumer computer systems 110, 112, 114 and/or data source computer systems 104, 106, 108. Optionally, the data transfer application may be downloaded from the data transfer system 102 to one or more of the data consumer computer systems 110, 112, 114 and/or data source computer systems 104, 106, 108.

The data consumer computer systems 110, 112, 114 and data source computer systems 104, 106, 108 may be in the form of a desktop computer, laptop computer, tablet computer, mobile phone, smart television, cloud-based system, and/or other computing system. A data consumer system and a data source consumer system may include user input and output devices, such a displays (touch or non-touch displays), speakers, microphones, trackpads, mice, pen input, printers, haptic feedback devices, cameras, and the like. A data consumer system or data source consumer system may include wireless and/or wired network interfaces via which the computer systems may communicate with each other or the data transfer system 102 over one or more networks.

User interfaces described herein are optionally configured to present data (optionally in real time) from sources described herein and to receive user commands, which may optionally be executed by the data transfer application in real time or in batch mode. The user interfaces may present controls and interfaces to provide finer control and to further ease the data transfer process. For example, a user of a data consumer system may request access to a user-specified file on a data source system (which may store scientific data, medical data, and/or other data). If the user has authorization to access the system, the data transfer application may access the file over a network, optionally using encryption to ensure the transferred data cannot be obtained by unauthorized systems.

A client (e.g., a system browser or a dedicated network resource access application) may initiate a handshaking message to the data source system. The handshaking message may identify the cipher suites supported by the client and other cryptographic information (e.g., the maximum supported version of transport layer security or secure sockets layer, the client's order of preference). The handshaking message may optionally identify data compression methods supported by the user device. The handshaking message may include a random byte string that may be used in generating encryption keys.

The data source system may respond to the client with a handshaking signal which identifies the cipher suite suit and encryption version (selected from those identified in the client handshaking message) that will be used. The data source system message may also include a session ID and another random byte string. The data source system may additionally transmit its digital certificate. The data source system may also transmit a client certificate request that identifies the types of certificates supported and the Distinguished Names of acceptable Certification Authorities (CAs), which the client may verify.

The random byte string transmitted by the client to the data source system may be utilized by both the client and the data source system to generate a secret key that may be used for encrypting subsequent message data. Asymmetric encryption may be utilized to generate a shared secret key. The random byte string itself may be encrypted with the data source system's public key.

By way of further example, a given item of data may encrypted using an AES-128 key or public key cryptography/asymmetrical cryptography. If symmetric encryption is used, than the encryption key and the decryption key may be the same key. If public key cryptography/asymmetrical cryptography is used, then a public key may be used to encrypt the data and a private key may be generated to decrypt the data.

Optionally, a version of the user interfaces described herein may be enhanced for use with a small touch screen (e.g., 4 to 13 inches diagonal), such as that of a mobile phone or small tablet computer. For example, the orientation of the controls may be relatively more vertical rather than horizontal to reflect the height/width ratio of typical mobile device display. Further, the user interfaces may utilize contextual controls that are displayed in response to an inferred user desire, rather than displaying a large number of tiny controls at the same time (which would make them hard to select or manipulate using a finger).

Figure 1B:
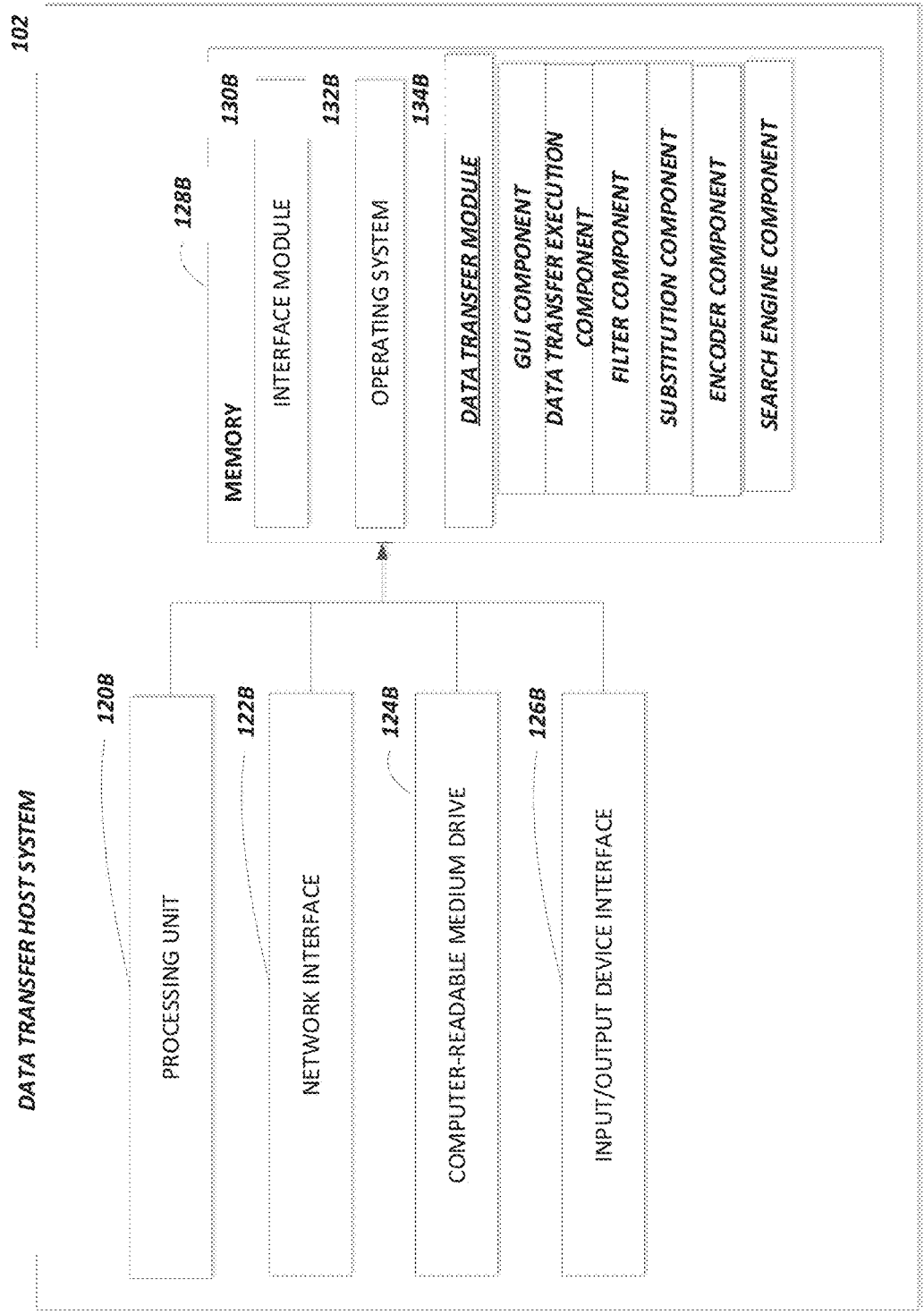
FIG. 1B is a block diagram illustrating an embodiment of example components of a data transfer computing system.

FIG. 1B is a block diagram illustrating an embodiment of example components of the example system hosting a data transfer application. The system includes an arrangement of computer hardware and software components that may be used to implement aspects of the present disclosure. Those skilled in the art will appreciate that the example components may include more (or fewer) components than those depicted in FIG. 1B.

The system hosting the data transfer application may include one or more processing units 120B (e.g., a general purpose processor and/or a high speed graphics processor with integrated transform, lighting, triangle setup/clipping, and/or rendering engines), one or more network interfaces 122B, a non-transitory computer-readable medium drive 124B, and an input/output device interface 126B, all of which may communicate with one another by way of one or more communication buses. The network interface 122B may provide connectivity to and communications with one or more networks or computing systems (e.g., one or more of the systems illustrated in FIG. 1A). The processing unit 120B may thus communicate information and instructions to and/or from other computing devices, systems, or services via a network. The processing unit 120B may also communicate to and from memory 124B and further provide output information via the input/output device interface 126B. The input/output device interface 126B may also accept input from one or more input devices, such as a keyboard, mouse, digital pen, touch screen, microphone, camera, other sensors, etc.

The memory 128B may contain computer program instructions that the processing unit 120B may execute in order to implement one or more aspects of the present disclosure. The memory 120B generally includes RAM, ROM (and variants thereof, such as EEPROM) and/or other persistent or non-transitory computer-readable storage media. The memory 120B may store an operating system 132B that provides computer program instructions for use by the processing unit 120B in the general administration and operation of the data transfer module 134B, including it components. The memory 128B may store user accounts including data transfer instructions and command files previously specified by a user and default overrides specified by the user, such as the instructions and default overrides described herein. Optionally, in addition or instead, the data may be stored remotely on a cloud-based or other networked data store. The account data may optionally be stored in a relational database, an SQL database, a NOSQL database, a hierarchical database, an object oriented database, a graph database, and/or other database type.

The memory 128B may include an interface module 130B. The interface module 130B can be configured to facilitate generating one or more interfaces through which a compatible computing device, may data send to, or receive data from the data transfer module 134B.

The modules or components described above may also include additional modules or may be implemented by computing devices that may not be depicted in FIGS. 1A and 1B. For example, although the interface module 130B and the data transfer module 134B are identified in FIG. 1B as single modules, the modules may be implemented by two or more modules and in a distributed manner. By way of further example, the processing unit 120B may include a general purpose processor and a graphics processing unit (GPU). The system hosting the data transfer application may offload compute-intensive portions of the applications to the GPU, while other code may run on the general purpose processor. The GPU may include hundreds or thousands of core processors configured to process tasks in parallel. The GPU may include high speed memory dedicated for graphics processing tasks. As another example, the system hosting the data transfer application and their components can be implemented by network servers, application servers, cloud-base systems, database servers, combinations of the same, or the like, configured to facilitate data transmission to and from data stores, and other party systems via one or more networks. Accordingly, the depictions of the modules are illustrative in nature.

Certain example user interfaces will now be discussed with reference to the figures. Referring to FIG. 3A, an example move-all "mover" user interface. As will be described, the mover user interface is configured to reduce the number of input commands needed to perform a data transfer, and prepopulates certain file and/or file type selection fields in a manner that makes the user interface highly efficient.

On the left side of the mover user interface are controls (e.g., tabs) 300A via which the user may quickly and easily navigate to other user interfaces discussed herein (e.g., the variables user interface, the filtering user interface, the settings user interface, the command user interface, the user logs user interface, and an activation user interface). The currently selected tab may be highlighted as compared to other tabs (e.g., via color, bolding, shadowing, animation, change in font, or otherwise).

Referring again to FIG. 3A, the mover user interface includes several areas, including an input file selection area, an output file selection area, and a command controls area. As similarly discussed above, to move data generated by a given program (e.g., an electronic medical health records system) in a corresponding format to a different format for consumption by another program (e.g., statistical analysis program, a modeler program, etc.), the user selects an input file type from a menu of supported input file types via an "input file type" drop down menu 302A (which, as similarly discussed elsewhere herein, may include types such as a spreadsheet format, a data mining program format, an analysis and design processes program format, a database program format, statistical analysis program format, an open document format, a data analysis and visualization program format, an electronic medical record program format, a portable document format (PDF), and/or the like), specifies the input file (e.g., by selecting a file window control 304A and navigating to and selecting the input file, or by manually and directly entering the input file path in the file specification field), selects an output file type from a menu of supported output file types via an "output file type" drop down menu 306A (which may include some or all of the file types discussed herein with respect to the input file types (e.g., a spreadsheet format, a data mining program format, an analysis and design processes program format, a database program format, statistical analysis program format, an open document format, a data analysis and visualization program format, an electronic medical record program format, a portable document format (PDF)), and/or other file types), specifies the output file (e.g., by selecting a file window control 308A and navigating to and selecting the output file, or by manually and directly entering the output file path in the file specification field). Optionally, the move operation may be easily initiated by simply activating a move control in contrast to the many control inputs that may be conventionally needed.

Figure 3H:
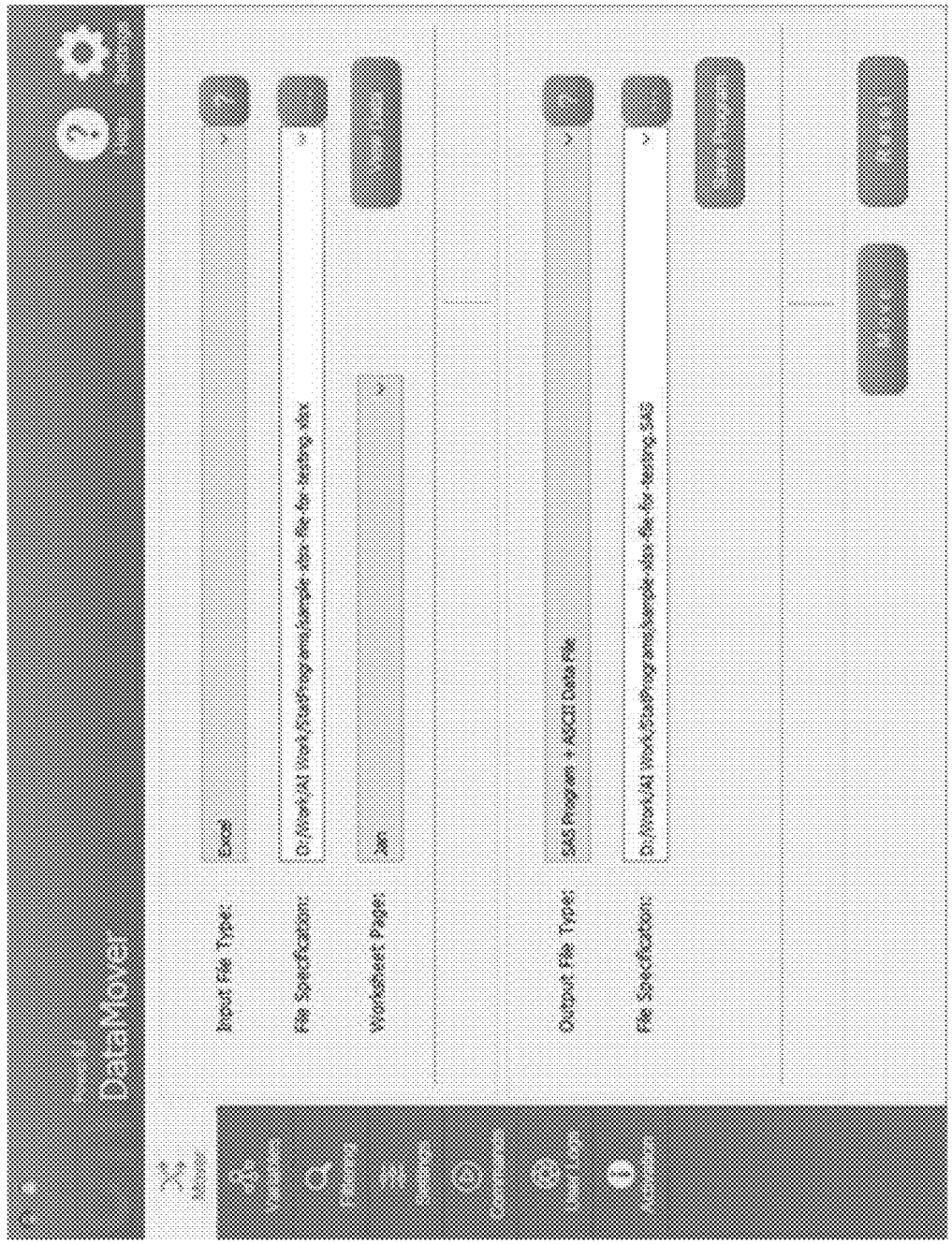

A reset control may be provided. Once a move operation is completed (or prior to activating the move control), when the reset control is activated, the input and output file specifications may be deleted from the corresponding input and output file specification field, while the input and output file types may remain unaltered. Optionally, after a reset operation, the user interface is configured to force the user to select the new input file type first and then the output file type.

Where a spreadsheet/worksheet is selected as the input file, the application may scan the file to determine if the file contains multiple pages. If a determination is made that the spreadsheet/worksheet includes multiple pages, the mover user interface may be dynamically modified in real time to provide a spreadsheet/worksheet page selection interface. A determination may be made as to whether the spreadsheet/worksheet includes names for the pages. If a determination is made that the spreadsheet/worksheet includes names for the pages, those names may be presented via the spreadsheet/worksheet page selection interface, and the user may select a desired page by selecting the corresponding page name. If, on the other hand, a determination is made that the spreadsheet/worksheet does not include names for the pages, different names may be automatically generated for respective spreadsheet/worksheet pages, which each name includes a unique number or text (e.g., Sheet 1, Sheet 2, etc.; Sheet A, Sheet B, etc.). The user may select a desired page by selecting the corresponding generated page name. Optionally, the first page of the spreadsheet/worksheet is automatically selected to populate the page selection user interface, and the user may select a drop down menu to display all the pages from which the user may select. FIG. 3H illustrates an example user interface via which a user can specify an input type (e.g., EXCEL spreadsheet), a file specification (indicating where the input file is located), a spreadsheet page, an output file type (e.g., SAS Program+ ASCII data file), and an output file specification.

Where a database (e.g., MICROSOFT ACCESS) is selected as the input file, the application may access and display the table names via a table selection interface and the user may select the desired database table. Optionally, the first table of the database is automatically selected to populate the table selection user interface, and the user may select a drop down menu to display all the database tables from which the user may select.

Where a SAS CPORT or SAS Transport file is selected as the input file, the application may access and display the Member names via a Member selection interface and the user may select the desired Member. Optionally, the first Member of the file is automatically selected to populate the member selection user interface, and the user may select a drop down menu to display all the Members from which the user may select.

The application may track and maintain a list of the most recently used input files and/or the most recently used output files for each file type (e.g., track and maintain a list of the last ten files for each file type that have been opened). The mover user interface may provide access to such a list of most recently used files for each file type. Thus, if a user specified a certain file type for the input or output file, the mover interface may access and display the corresponding list of most recently used files from which the user may select.

Advantageously, a data viewer function may be provided. A "view data" control may be provided via the mover user interface which, when activated, provides a preview of the input data from the selected input file. For example, the previewed data may be displayed in a scrollable grid (with rows and columns). Optionally, the grid may be interactive, where the user interface enables the user to drag a column from one position to another position (e.g., by clicking and holding the column heading and then dragging the column to a desired location). An exit/close control is provided, which when activated, closes the preview user interface, and mover interface is again displayed.

As similarly discussed above, to further ease the process of transferring data, when the mover interface is employed, the application automatically selects for movement, by default, all variables from an input file once the input file has been selected. The automatically selected variables and the total number of variables may be displayed (e.g., immediately below the input file specification).

If the user wants to manually select the variables to be transferred, the user may access a variables user interface. With reference to FIG. 3B, a variables user interface may be provided that enables a user to select a subset of the variables in the input data set. A variable names field may be provided, listing each variable in the input file with an associated checkbox (or other variable-selection user interface). The interface enables the user to select the variables to be moved to the output file. Optionally, as a default, the data transfer application will preselect all the variables and the user may deselect variables via the corresponding checkboxes as desired. The variables user interface will also enable the user to reselect a deselected variable.

Where there are a large number of variables in the input file, and hence it may be difficult and time consuming to select or deselect variables, a "Quick Variable Selector" function may be provided which enables the user to apply a filter so that only variables that have a common feature are displayed for selection. For example, if the user wants to select or deselect all of the variables, the user may enter a corresponding wildcard symbol (e.g., "*") in a "Quick Variable Selector" field and select a "Keep" control (so that the default variable selections will be maintained) or a "Drop" control (so that the default variable selections will be unselected).

If the user wants only a subset of variables to be presented for selection or deselection a combination of alphanumeric characters and wild cards may be used, and a search engine will find and return corresponding variables (e.g., identified by variable names) with corresponding user selection mechanisms, such as checkboxes (which may optionally be selected by default) or deselect. Optionally, once the user enters the search/filter terms and activates the drop control, the data transfer application will use the search engine to identify the matching variables, and will automatically deselect such variables so that they will not be transferred. Similarly, once the user enters the search/filter terms and activates the keep control, the data transfer application will use the search engine to identify the matching variables, and will automatically select (if not already selected) such variables so that they will be transferred.

For example, the wild card characters may include "*", "?", or "–" (for ranges). By way of illustration, the asterisk sign*matches zero or more characters, and the question mark "?" matches a single character. Unlike conventional search engines that support wildcards, more than one asterisk may be included in a search term. For example, "*dm*" will match any variable with the string "dm" in any position. Ranges of continuous variables may be specified with a dash without spaces between two variable names. For example, "weight-m28" will cause the search engine to identify variables "weight" through cm28', inclusive, and present those variables in association with a user selection/deselection control (e.g., a checkbox).

In addition, lists, such as space or comma delimited lists of conditions can be entered at one time. By way of illustrative example, if the user enters the terms Height, Weight, N3-N8, DM1* in the Quick Variable Selector field and activates the "Drop" control, the data transfer application will unselect (if previously selected) the variables "Height", "Weight", "N3" through "N10" and any variable which starts with the string 'DM1'.

When the data transfer application automatically selects or deselects variables in accordance with the search/filter terms and the activation of the keep or drop controls, the system may present the matching variables with associated checkboxes (or other selection/deselection mechanism), and the user may manually select or deselect variables as desired.

Once search results are returned by the search engine, the user may further refine the search/filter terms using corresponding wildcards and alphanumeric characters, activate the drop or keep controls as desired, or manually select or deselect variables for transfer.

Output variables may be of many different types (e.g., string, byte, integer, long, floating point, double precision floating point, date, date/time, time, etc.) and different output formats may use different variable types. Advantageously, the data transfer application may automatically choose output types or enable the user to specify the output types manually. In order to ensure the accuracy and precision of the variable transfer (and to ensure that variable consuming programs are enabled to generate correct output), the data transfer application optionally preserves numerical accuracy stays intact by initially storing numeric variables as double precision floating point numbers, and then storing the variables in accordance with their assigned variable type.

The data transfer application may perform a sophisticated analysis in order to determine a recommended or selected output type to acceptably preserve numeric precision and reduce or minimize the size of the resulting output data set. The data transfer application may automatically determine the maximum length of string variables and the optimum output type of each variable (given on the available information and any constraints). However, the user interface may enable the user to override the recommendation (which may be set as the default variable type) and may manually select the variable output types.

When reading numerical variables, the data transfer application may analyze the information available to select a preferred or recommended target variable type. Optionally, no data is persistently stored during internal transfer. Optionally, if the preferred output type is not supported in the chosen output file type, an approximation (e.g., the best approximation will be chosen).

Example, target output variable types that may be used by the data transfer application include some or all of the following:

| No | Target type | Description |
|---|---|---|
| 1 | byte | One byte signed integer (–128 to 100) |
| 2 | Int | Two byte signed integer (–32768 to 32740) |
| 3 | Long | Four byte signed integer |
| 4 | Float | Four-byte IEEE single precision floating point number |
| 5 | Double | Eight-byte IEEE double precision floating point number |
| 6 | Date | Date stored as serial day number (days since Dec. 30, 1899) |
| 7 | Time | Fraction of a day (12:00 noon = .5) |
| 8 | Date/time | Floating point number (integer-serial day number; fractional part-time) |
| 9 | String | Character string (which may be stored internally in Unicode UTF-8 representation) |

After the output variable target type is selected by the data transfer application, a determination may be made as to whether the variable target type is available. If the selected variable target type is not available, then the data transfer application may select the next larger size format to ensure that the variable target type can support the variable while keeping the format size as small as possible.

Certain additional detail will now be provided with respect to the automatic optimization of target types.

To generate a small (e.g., the smallest) possible output data set the data transfer application may perform an additional optimization pass during the moving operation, to determine additional information about each variable and then will assign target output types. Initially, the information present in the data file directory is not enough for the data transfer application to adequately perform optimization of target types. For example, the information present in the data file directory may be mainly limited to output variable types (e.g., floating point, integer, etc.).

The optimization pass may be flexible so as to accommodate several different types of variables, such as string typed variables, integer typed variables and real typed variables.

Optionally, before performing the optimization pass, the data transfer application determines the output variable's type to consume the optimal (e.g., minimum) memory space without any loss of information based on the value distribution of the input variables and the possible output variable types.

For example, if data present in the data file directory comprises string variables, then the data transfer application may perform an additional optimization pass because the length of output strings can be changed when they are moved to different output encoding.

Because variables can be represented as integers in the data transfer application, the smallest integer type can be utilized to represent the data. If a variable cannot be represented as an integer type, the data transfer application can automatically determine whether it can be represented as a four-byte IEEE single precision floating point number rather than an eight-byte IEEE double precision floating point number (which would utilize twice as much memory as a single precision floating point number) without loss of information. Information regarding the maximum length of a string variable may be accumulated and stored in the variable with the smallest possible length.

A user may initiate the optimization process by activating an "optimize" control presented by the variables user interface before the data transfer is performed. If the user does not manually activate the optimize control, the optimization may optionally be automatically performed during the data transfer process.

If the user manually activates the optimize control, the data transfer application may cause the target types selected by the data transfer application to be presented to the user prior performing the data transfer operation. The user may be enabled to change any output types to desired output types.

In order to facilitate user changes of the output types for multiple variables, a variable change tool is provided to enable the output types be changed for multiple variables at the same time. Referring again to FIG. 3B, a "Quick Variable Type Changer" field is provided that enables batch processing of a change of the output type of multiple variables. As similarly discussed above with respect to the selection of variables, search/filter criteria may be entered into the Quick Variable Type Changer", and a search engine will identify matching variables which may be displayed. The user may then change the output type of the identified variables to the same output type.

For example, the wild card characters may include "*", "?", or "–" (for ranges). By way of illustration, the asterisk sign*matches zero or more characters, and the question mark "?" matches a single character. Unlike conventional search engines that support wildcards, more than one asterisk may be included in a search term. For example, "*dm*" will match any variable with the string "dm" in any position. Ranges of continuous variables may be specified with a dash without spaces between two variable names. For example, "weight-m28" will cause the search engine to identify variables "weight" through cm28', inclusive, and present those variables, optionally in association with a selection/deselection control (e.g., a checkbox) that enables the user to deselect a variable from having its output type changed. In addition, lists, such as space or comma delimited lists of conditions can be entered at one time.

The user can then select a desired output type (e.g., string, byte, integer, long, float, double precision, date, date/time, time, etc.), activate a change command, and the batch change of output type may be performed for all the variables that matched the filter terms (excluding any variables that may have been deselected by the user).

A variable names field may be provided listing the variable names, and the user can select the variables that are to be transferred.

Optionally, in order to further reduce the utilization of computer resources which would otherwise be expended on the transfer of data items from an input data set that are not meaningful, a filter function may be provided that automatically excludes some or all of such data from being transferred. For example, an input data set may contain constants or missing variables, whose transfer would not be beneficial or needed. A "Drop Constants" control (e.g., a checkbox) may be provided via the variables user interface. If the user activates the drop constants control, and then activates a move control, the data transfer application will automatically drop variables that are constant or missing for a selected subset of data that is being transferred. Further, this features reduces the amount of interactions needed by the user with the data transfer application that would otherwise be needed to manually select variables that are constant or missing to exclude from a data transfer.

Referring again to FIG. 3B, as discussed above, the data transfer application may, by default, save variables in a double precision floating point. A "Use Doubles" control (e.g., a checkbox) may be provided that may be set (e.g., checked) by the data transfer application to store variables in double precision floating point. The user may manually select the double precision floating point (e.g., where the user does not need such precision, and/or in order to reduce computer resource utilization, such as network, memory, and processor utilization).

In addition, as similarly discussed above, in order to reduce memory utilization, the data transfer application may evaluate a given variable to determine if the variable can be represented as a single precision floating point number without loss of information. Optionally, the data transfer application may only store those variables need such precision as a double precision floating point value. Because source data is often not stored using more than eight or nine digits (and can be represented using single precision floating point without a loss of information), reducing or eliminating the use of double precision floating point can greatly reduce the size of the output file.

Optionally, if the user unselects the "use doubles" control or selects a single precision floating point option, the use of single precision floating point may be set as the new default format (which may be changed or overridden by the user).

Once the user has completed selecting variables to be transferred, when the user selects the mover user interface, the selected variables will be displayed. As similarly discussed above, the mover user interface enables the user to select the output file format via the output file type user interface (which may present a menu of supported file types). Optionally, the settings user interface may enable the user to specify SAS output file types (e.g., SAS V6, SAS V7-8, and SAS V9), an SPSS output, a Strata output (where the user is enabled to specify that the Strata is to be output as a Standard State, Stata(SE), etc.), and specify a fixed format ASCII output type (e.g., SAS Program+ASCII Data File, IBM SPSS Program+ASCII Data File, Stata Program+ASCII Data File).

As similarly discussed above, the mover user interface enables the user to select an output file. Because the data transfer supplies a default specification for the output file (e.g., after the user selects the input file specification), if the user is satisfied with the default output file specification, the user does not even have to select an output file type. If the user wants to change from the default output file specification the user may enter or edit the desired output file name in the file specification field.

Once the input file is chosen, the data transfer application may generate an output file specification having same name and path as that of the input file but the set the standard extension will be as per the type of the output file. The generated output file may be displayed to user via the output file specification field of the mover user interface.

The data transfer application may maintain a record of directories that the user has recently moved data to (or from). For example, the data transfer application may maintain a record of the last 5, 10, or other number of directories that the user has recently moved data to (or from). The user may access the list of directories by activating a control associated with the output file specification user interface. The list of directories (which may be a scrollable list) may be presented to the user via the user device, and the user may select a desired directory from the list, which will show the output file name that appears in the output file specification edit interface. Optionally, the directory may instead be manually entered by the user (e.g., where the user wants to utilize a drive and directory that is not in the directory history).

Optionally, to avoid having the data transfer application inadvertently overwrite a previous output file, when a user has instructed the data transfer application to perform a move operation to an output file with a corresponding output file name in a given directory, the data transfer application will inspect the directory to determine whether a file with the same name is already present. If the data transfer application determines that a file with the same name is already present in the directory, the data transfer application may cause a textual warning to be presented to the user indicating that the existing file is about to be overwritten, and requesting that the user confirms that the existing file is to be overwritten. In response to the user confirming that the existing file is to be overwritten, the new output file will overwrite the existing file. Optionally, the user may disable warnings from being presented via a disable control.

Once the user has specified the input and output file types and names (with member, table, or page selections as appropriate), and has specified information on variables and case selection, the user can activate the move control and the data transfer application with accordingly move the data from the specified source to the specified destination.

As discussed above, alternatively, if the user wants to move all the source file data (rather than specific variables, cases, pages, tables, etc.), the user need only specify the input and output file types and file names via the mover user interface, and the data transfer operation may use the output types assigned by the data transfer application.

The data transfer operation may keep a log record of all of the user inputs, commands, and data transfer operation. The log may be viewable to the user via a log interface in the user log user interface. A log save control may be provided via which the user can manually save the log to memory. Optionally, the user may be enabled to transmit the log file and/or a link thereto to a specified destination address to thereby share the log. Thus, the data transfer operation enables thorough records of the user activities to be tracked and analyzed.

Referring now to FIG. 3C, an example filtering user interface is depicted. As similarly discussed above, the filtering user interface (which may be selected via a "filtering" tab) enables a user to select the cases to be moved from a specified source file to a output/destination file (thereby reducing the bandwidth and memory that would otherwise be needed to transfer and store the unneeded cases).

As illustrated, a scrolling content display area 302C may provide on-screen documentation and instructions regarding the user selection of data records or cases based on conditions and operators specified by the user. The input file variables (e.g., from the input file selected via the mover user interface illustrated in FIG. 3A) may be listed in a list field 304C.

A case-selection edit field 306C may be provided configured to receive a user case selection, or where an expression (e.g., a WHERE expression) may be entered that will specify cases. Such an expression may include conditions that will define a subgroup of the input file cases that will be selected. Advantageously, in order to avoid user entry errors and to the amount of user interaction that would be needed for the user to manually enter variables, the user interface may enter variable names into the case-selection edit field 306C by selecting (e.g., clicking or tapping on) the desired variable from the set variables names presented in the list field 304C (without having to go through the error-prone and time consuming effort of having to type in the variable names), which will then be presented in the case-selection edit field 306C (e.g., at a cursor position in the case-selection edit field 306C). Optionally, in addition to or instead, the user can type in the variable names.

As discussed above, a statement, such as a case-selection WHERE expression, may be used to specify the conditions that will define a subgroup of the data set that the user wants to select.

The case-selection WHERE expression have the following form:

WHERE [variable expression] [relational operator] [selection condition]

The variable expression may include one or multiple variables. The selection condition specified a condition that needs to be meet in order for a variable to be selected. The relational operator may include some or all of the following operators:

| Relational Operators | description |
| --- | --- |
| = | Equals |
| != | Not equal |
| < | Less than |
| > | Greater than |
| <= | Less than or equal |
| >= | Greater than or equal |
| & | And |
| \| | Or |
| , | Or (comma, used in series) |
| ! | Not |
| % | remainder after division by the operand following |

The data transfer application enables a user to specify rows or records of the input file to be referenced (e.g., using a "_rownum_" variable).

Following are certain examples of selection conditions used in WHERE expressions:

Where year !=2020

Where (test1+test2)/speed<20000

Where age=12 & rate>0.2

Where_rownum_>20000|test2<188

Where id % 5==0

Where name=John

Optionally, wildcards may be included in selection conditions to select subgroups of string variables. For example, the wild card characters may include "*", "?", or "-" (for ranges). By way of illustration, the asterisk sign*matches zero or more characters, and the question mark "?" matches a single character. Unlike conventional search engines that support wildcards, more than one asterisk may be included in a term. Following are examples of the use of wildcards in WHERE expressions:

Where phone=?333*

Where name=ma*|name=cam*

Because the wildcard "?" replaces a single character, while the wildcard "*" replaces one or more characters, the specification "?333*" in the above expression will select phone numbers of any length that have a 333 beginning at the second character position.

A comma "," operator may be utilized to select multiple values of same variable name. The use of the comma operator may be a more efficient (in terms of display area and memory) alternative as compared to lengthy, less efficient OR expressions. For example, the WHERE expression above (Where name=ma*|name=cam*) can be more efficiently expressed as:

WHERE name=ma*,cam*

The data transfer application may enable the user to save and later access and apply the same expression to several input files (e.g., by activating a "Preserve expression . . . " control (e.g., a checkbox)).

In certain instances, variable values may be missing from the input file. The data transfer application enables a user to define an expression that enables a user to search for and identify missing variables using a special operator: "_missing_". The search engine will then identify corresponding matching missing variables and generate a corresponding list of the matching missing variables, which may be presented to the user on the user device. The following is an example expression using the "_missing_" operator:

WHERE invoiceid !=_missing_ & date !=_missing_

Advantageously, the data transfer application may be configured with multiple sampling functions that may be used to access sample variables from the input file, such as by way of example, Simple Random Sampling, Random Sampling with Fixed Size, and Systematic Random Sampling.

By way of illustration, the random sampling may perform relatively simpler random sampling where each case is selected with a probability equal to a specified probability value ("prop"). An example random sampling expression may be in the form of:

Sample_rand(prop)

By way of illustrative example, an expression to instruct a random sample of one tenth of a data set may be in the form of:

Where sample_rand(0.1)

In addition, random sampling may be performed with a specified fixed sample size. An example random sampling expression may be in the form of:

Sample_fixed(sample_size,total_Filtering)

When using the random sampling with a fixed size function, the first case is drawn with a probability of sample_size/total_Filtering, and the succeeding $i^{th}$ case is drawn with a probability of (sample_size−hits)/(total_Filtering−i).

By way of illustrative example, if a data set had 1000 cases and the user wanted a random sample of 25 cases, the user may specify the following expression:

WHERE sample_fixed(25,100)

When using the systematic random sampling, the following expression structure may be utilized:

Sample_syst(interval)

The systematic random sampling function performs a systematic sample of every $n^{th}$ case after a random start. For example, to specify a sample of every $6^{th}$ case, the following expression may be utilized:

WHERE sample_syst(6)

The WHERE expressions may be evaluated from the left to right. Thus, a user can specify a sampling from a subset of cases by subsetting the cases first and then initiating the sampling.

For example, to randomly choose 30% of men over 180 tall, the following expression may be utilized:

WHERE height>=180 & sample_rand(0.3)

The data transfer application may include a random number generator (which may be pseudo-random number generator). The random number generator output may provide the basis of the sampling functions. The random number generator may, by default, be seeded using a permutation of the time of day and will thus produce a different sample in each sample run. Advantageously, if reproducible samples are desired, the data transfer application may enable the user to utilize the same seed each time to thereby provide reproduced samples.

Referring to the settings user interface illustrated in FIG. 3D, several functions and associated controls may be provided, where the user may use the interface to enable or disable some or all of the disclosed functions.

The data transfer application, may by default, generate variable names for variables being moved from an input file to ensure that the names are in a valid form that is supported by the output system and program, based as much as possible on the original variable names. The data transfer application will store the original variable names as variable labels, so that that original variable names are preserved, available to the user and programs, and may be used as descriptive text. However, optionally, the user may instruct the data transfer application, via the settings user interface (e.g., by selecting a "Write new, numeric variable names" option), to use the variable names of the form V1 . . . Vn, instead of the default variable names, which may be advantageous when handling with truncated names.

In addition, many programs that generate files, which may then be used as input files for a data transfer, enable users to assign the same set of value labels (sometimes referred to as a user-defined format) to more than one variable. Advantageously, the data transfer application enables the user to specify that the mapping of value label sets to multiple variables will be saved in or in association with the output file. For example, a "Preserve value label tags and sets" control may be provided (e.g., including a checkbox), which when selected will cause the data transfer to save the mapping of value label sets to multiple variables on output, and will preserve tags that are used in the input file to identify value labels sets. Optionally, in addition or instead (e.g., if it is determined that tags are not used in the input file to identify value labels sets), the data transfer system may automatically generate tags (e.g., TAGA-TAGZ or the like). Optionally, if the preserve value label tags and sets option is not enabled, the data transfer application may cause each labeled variable to be associated with a unique value label set, and the tag used to identify the set is automatically constructed from the name of the variable.

A "Use Doubles" option may be provided (e.g. selectable via check box), which when enabled will cause the data transfer application to use the double precision floating point format when it optimizes the output data set. Optionally, by default, this option is enabled and a user can disable the user doubles option to reduce the size of the output dataset and where the precision of measurement of all of the variables being transferred is less than eight decimal digits.

To further reduce computer resource utilization (e.g., network, memory, and/or processor utilization), when combining different files, the data transfer application optionally uses the minimum string width of each variable to make ensure that the output file is kept as small as possible. A Preserve String Widths if Possible control may be provided, and if enabled, the data transfer application will use the input width as the output width only if data will not be lost as a result. Optionally, the data transfer application will prevent the output width from being smaller than the input width (although the output width may be larger than the input width).

In certain scenarios, if an input file contains text data or data which comes from a format which maintains the width originally used to read the data (for example IBM SPSS statistics data), it may useful to preserve the data width (e.g., the numeric data width). In order to respond to this technical challenge, the data transfer application provides the option to preserve the numeric widths if possible. This function may be selected by a user, for example, when the event wants to keep the width of the output variable data the same as that of the input variable data being transferred. Optionally, the data transfer application detects that the output variable is wider than the input variable, then input will be widened to prevent loss.

In addition, an input file may include metadata (sometimes referred to as "extended attributes," "characteristics," "custom attributes," or the like). By way of example, attributes may be attached at the file level and/or the variable level. A "Write Extended Attributes" control may be provided via the settings user interface. If the user activates the "Write Extended Attributes" option, the data transfer extended attributes will be written to any file that supports them. Optionally, the data transfer application may disable the write extended attributes function as the default, and optionally, if the user enables the function for a given session, the data transfer system will reset the function to "disabled" as the default for the next session.

Another example feature optionally provided by the data transfer application enables the user to provide the seed for random sampling processes via the settings user interface. Optionally, by default, the data transfer application will automatically generate a starting seed randomly (e.g., based on clock time) for use in the sampling functions each time a data transfer process is executed. Thus, each time a data transfer operation is performed on a given file, the data transfer application will select a different sample for inclusion in the output file. However, the user may be enabled to override the default via a field configured to receive a user-provided seed. This enables the user to utilize the same seed for each random sampling operation during data transfer sessions. This enables the user to obtain a reproducible sample when needed.

Yet another example feature optionally provided by the data transfer application performs variable name case conversions.

Variable naming rules are used by the data transfer application for output files. Such variable naming rules may be used to support the scenario where a program (e.g., a relatively older program) that only utilizes upper case variable names is being used as the source, but the program consuming the data from the output file is case sensitive and uses mixed case variable names. If a case-sensitive program is being used and if the data transfer application were to move data from an upper-case system without performing case-conversion on the variable names, the user of the data set would always need to hold down the shift key when typing in variable names. The data transfer application may also enable the use to specify case conversion instructions for both case-sensitive and case-insensitive packages. For example, controls may be provided via respective menus for both case-sensitive and case-insensitive programs, such as some or all of the following: convert variable name upper case characters to lower case characters ("convert to lower"); preserve variable name cases if the name includes both upper case and lower case characters ("preserve if mixed"); preserve variable name character cases regardless of the variable name character cases ("preserve always"); convert variable name lower case characters to upper case characters ("convert to upper").

Optionally, the data transfer application may have different defaults for character name case conversions for case insensitive programs and for case sensitive program. For example, "preserve always" may be set as the default for case insensitive programs, and "preserve if mixed" ("convert to upper") may be set as the default for case sensitive programs. If both upper and lower-case letter are found in a variable name, the variable name cases may be preserved, and if all the characters in name are uppercase they may be converted to lower case.

For example, the following programs may be considered case-sensitive on output: STATA, S-PLUS, R, and MATLAB. The following programs may require upper-case variable names: SAS VERSION 6, SAS XPORT, SPSS PORTABLE and SYSTAT. Certain other programs may be case-insensitive.

As similarly discussed elsewhere herein, certain variables values may be determined to be missing during a data transfer operation. Different programs treat missing values for input file containing more than one data type differently. Certain statistical programs distinguish between "system missing", such as the result of a divide by zero (which provides an invalid indication rather than a calculated value), and "user-missing" which is a numeric value defined as a missing value by the user. Further, particularly in survey research, distinctions are made between user-defined missing values that represent structurally missing data (such as answers to pregnancy history questions from biologically male respondents, which would be inapplicable), and those that represent categories of non-response or that represent a failure in collecting the correct data.

To represent "inapplicable" missing values, "zero" may be used to represent such missing values, and to represent responses such as "not ascertained," "refused," "don't know," or the like, numbers greater than zero may be used to represent such "missing" values. Other mappings of missing values to missing value indicators may be used.

Several functions may be provided to manage missing variables. For example, if a "Use All" option is selected (which may be set by default), the data transfer application may determine when multiple missing values are allowed by a program (such as in IBM SPSS, for example), and if so the multiple missing values may be stored as a single value on output file. The mapping to a missing value on output may be determined by an option "Map to extended (a-z) missing".

A user-selectable "Use First" option enables tabulations in the target package (which includes the output file) of non-responses. This option maps the first user defined missing value as system missing value and the remainder may be left intact and transferred to the output data set. A user-selectable "Use None" option will cause the data transfer application to map user-missing values to a system missing value. A user-selectable "Map to extended (a-z) missing" will cause the data transfer application to convert user missing values to system missing value in the target package.

If the "Map to extended (a-z) missing" option is enabled by the user, user missing values will be mapped, if possible, to extended missing values in the target packages that support them (e.g., SAS, ASCII, or STATA). The mapping may optionally be performed in alphabetic order (e.g., from a to z).

If a "Map using variable labels" option is enabled by the user, the data transfer application may map the user missing value to the first character of the value label. For example, if value "0" is a user missing value that is labeled as "effort", the value "0" will be mapped to the letter "e" (the first character in "effort"). If there is no value label, the user missing value may be mapped as per alphabetical order.

The data transfer application may also enable the user to control the representation of date and time value.

The settings interface may optionally be configured to enable the user to selectively specify a default input character encoding. For example, the settings interface may optionally be configured to enable the user to selectively specify an output character set that is to be used when encoding input data for an output file. However, because the selection of the character set is a very complex process, advantageously the data transfer application performs such character set selection by default. Although character sets can generally be converted to Unicode, it can be very challenging to obtain a desired character set from Unicode.

Optionally, for file formats that are Unicode-aware (e.g., EXCEL, SAS 9+, etc.), the data transfer application write the output file using Unicode (and may override a user-specified character set).

Unicode may generally be used to represent character set. However, a technical challenges is posed as when the data transfer application starts to convert Unicode into a character set, the output character set may contain less characters than the input character set, then in conversion some characters may be missed or are unable to be decoded because such characters are encoded in a different character set.

When some characters are unable to decode, then the data transfer application uses a substitution technique in which there are certain characters used for those characters which cannot be encoded. If there is no substitution of a character available, then the data transfer application may use a default character (e.g., an underscore) are used for character substitution. Optionally, a control may be provided via which the user can disable such substitutions. Optionally, to ensure that the number of substitutions does not render the output file overly degraded, a substitution error limit may be set that limits the number of permitted substitutions. A notification may be presented to the user if such substitution error limit is met or exceed, wherein the notification notifies the user regarding the number of substitutions and that the substitutions met or exceed that limit.

Optionally, the data transfer system may set a default limit on the number of substitutions per file (e.g., 100 cases of missing values or less than a specified percentage of the sampled data). Optionally, an interface is provided via which the user can modify the substitution limit. The limit may be set based on the understanding that if the amount missing data is sufficiently small (e.g., less than 3% to 7% of the sampled data), then statistically such values may be excluded from the analysis.

Figure 2:
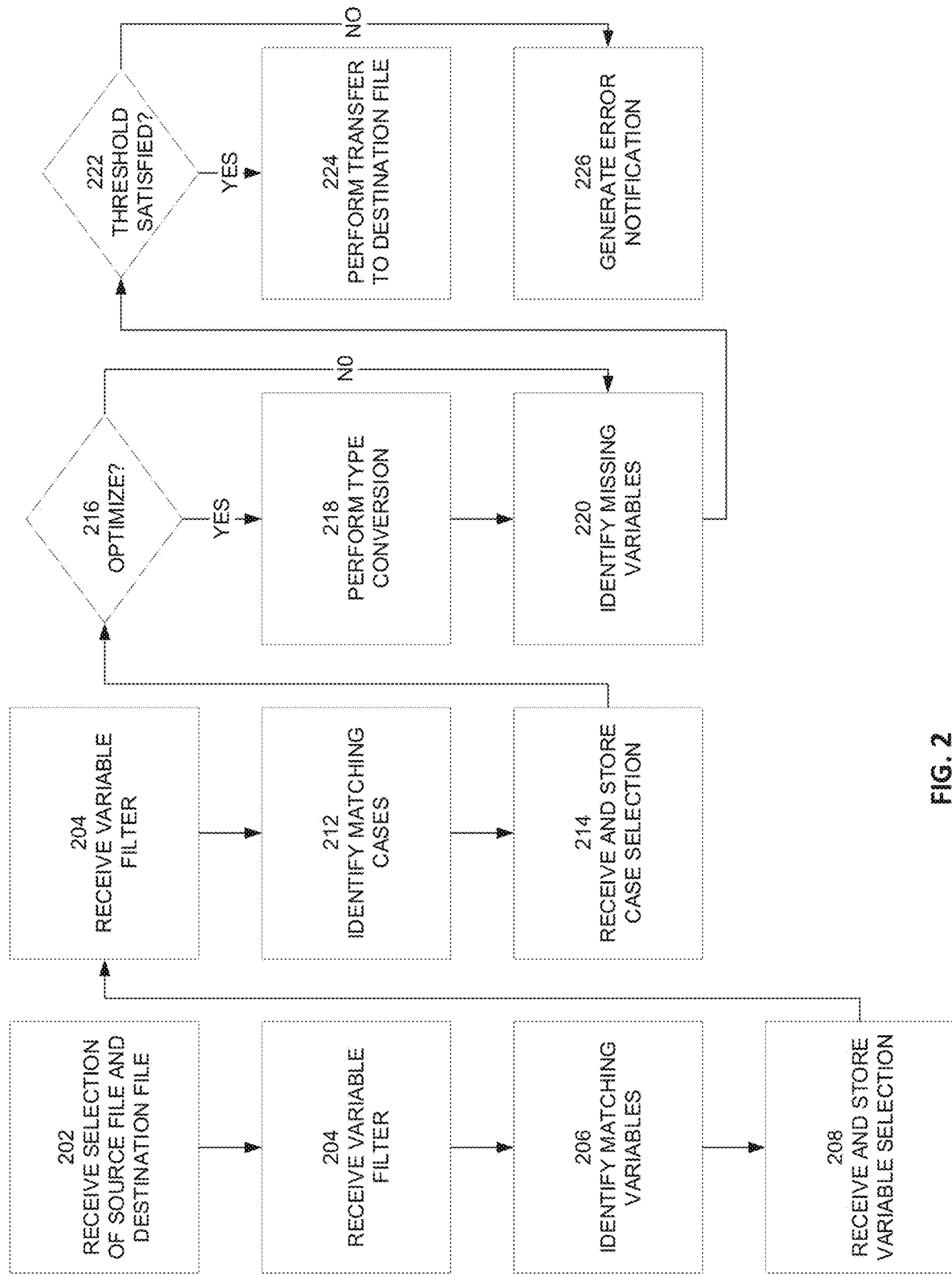
FIG. 2 illustrates an example process.

FIG. 2 illustrates an example process configured to perform a data transfer process that may be performed using the data transfer application as described elsewhere herein. The process may optionally be performed using the user interfaces described herein. As discussed elsewhere herein, the user interfaces may enable a user to provide various instructions which may be executed by the data transfer application, and to display information provided using the data transfer application (e.g., where the information may include information accessed from source/input files).

At block 202, a source file selection is received and a source file type selection is received via a user input (where the source file may be stored on a remote system, such as that associated with a scientific (e.g., medical) researcher. For example, the source file may include research and/or medical data. At block 204, a variable filter term is received from a user via a user interface. The variable filter term may include alphanumeric characters and/or one or more wildcards and operators as similarly discussed elsewhere herein.

At block 206, matching variables from the source file may be identified (e.g., using a search engine that identified variables that match the variable filter term). As discussed elsewhere herein, optionally the user may instruct the data transfer application to transfer all variables, thereby bypassing the variable filter process. At block 208, the matching variables may be presented to the user via a user interface. The user may optionally select or deselect variables for the data transfer, and such selections may be stored. Optionally, instead, the user may elect to have all the matching variables transferred.

At block 210, a case filter term is received from a user via a user interface. The case filter term may include alphanumeric characters and/or one or more wildcards and operators as similarly discussed elsewhere herein. At block 212, matching cases from the source file may be identified (e.g., using a search engine that identified cases that match the case filter term). As discussed elsewhere herein, optionally the user may instruct the data transfer application to transfer all cases, thereby bypassing the case filter process. At block 214, the matching cases may be presented to the user via a user interface. The user may optionally select or deselect cases for the data transfer, and such selections may be stored. Optionally, instead, the user may elect to have all the matching cases transferred.

At block 216, a determination may be made as to whether an optimization process is to be performed (e.g., in response to a user instruction provided via a user interface or automatically). As discussed elsewhere herein, as part of the optimization process, the data transfer application may select a target type (e.g., a single precision floating point format, an integer format, etc.) for a variable so as to minimize or reduce memory storage utilization without losing any or significant information.

At block 218, in response to determining that an optimization process is to be performed, a target type conversion (e.g., from a double precision floating point format to a single precision floating point format) may be performed with respect to one or more variables.

At block 220, missing variables in the source file may be identified. For example, a variable may be considered system missing or user missing. As similarly discussed elsewhere herein, a system missing value may be the result of a divide by zero (which provides an invalid indication rather than a calculated value), a "user-missing" value may be a which is defined as a missing value by the user, and a structurally missing value which may be an inapplicable value.

At block 222, a determination may be made as to whether the number of missing values satisfies a missing value error threshold. For example, if the number or percentage of missing values is less than a defined missing value error threshold, the threshold may be satisfied. If, on the other hand, the number or percentage of missing values is equal to or greater than the defined missing value error threshold, the threshold may be violated.

If a determination is made that the missing value error threshold is satisfied, the process may proceed to block 224, and the variable data transfer process may be performed (which may include the type conversions and missing value mappings, where missing values (e.g., user-missing values) may be mapped to and replaced with system missing value indicators in the destination file).

If a determination is made that the missing value error threshold is not satisfied, the process may proceed to block 226, and an error notification may be generated and presented or transmitted to one or more destinations (e.g., email addresses, messaging service (e.g., SMS, MMS, etc.) addresses, and/or other destinations). The data transfer process may optionally be inhibited.

Thus, systems and methods are described that securely and efficiently access data from disparate sources in disparate formats, that covert such data into formats useable for desired purposes, such as for modeling purposes, while optimizing variable target formats so as to reduce memory utilization without losing data, and that provide such converted data to destination systems and programs.

The methods and processes described herein may have fewer or additional steps or states and the steps or states may be performed in a different order. Not all steps or states need to be reached. The methods and processes described herein may be embodied in, and fully or partially automated via, software code modules executed by one or more general purpose computers. The code modules may be stored in any type of computer-readable medium or other computer storage device. Some or all of the methods may alternatively be embodied in whole or in part in specialized computer hardware. The systems described herein may optionally include displays, user input devices (e.g., touchscreen, keyboard, mouse, voice recognition, etc.), network interfaces, etc.

The results of the disclosed methods may be stored in any type of computer data repository, such as relational databases and flat file systems that use volatile and/or non-volatile memory (e.g., magnetic disk storage, optical storage, EEPROM and/or solid state RAM).

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "may," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications/alerts and user interfaces described herein may be provided via a Web page, a dedicated or non-dedicated phone application, computer application, a short messaging service message (e.g., SMS, MMS, etc.), instant messaging, email, push notification, audibly, a pop-up interface, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, voice recognition, etc.), network interfaces, etc.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system configured to securely access content comprising variables from one or more computer content storage facilities, comprising:
    memory configured to store instructions; and
    one or more processors in communication with the memory, the one or more processors configured to execute the instructions to cause the system to:
        receive, via a user input file type user interface presented on a first display, the user input file type user interface comprising an input file type menu comprising at least:
            a statistical analysis program input file type menu entry, and
            a spreadsheet program input file type menu entry;
        a selection of an input file type from the input file type menu displaying at least the statistical analysis program input file type menu entry and the spreadsheet program input file type menu entry;
        receive, via a file specification user interface presented on the first display,
        a file specification for a source file;
        receive, via a destination file type user interface presented on the first display, the destination file type user interface comprising a destination file type menu including at least:
            a statistical analysis program destination file type menu entry, and
            a spreadsheet program destination file type menu entry,
        a selection of a destination file type from the destination file type user interface comprising the destination file type menu including at least:
        the statistical analysis program file type, and
        the spreadsheet program file type;
        receive, via a file specification user interface presented on the first display configured to enable the user to select a destination file to which data from the source file is to be transferred, a file specification for the destination file;
        receive a user-specified variable filter via a corresponding user interface, the user-specified variable filter configured to be used to identify variables in the source file to be transferred to the user selected destination file of the user selected destination file type;
        identify, using a search engine, variables in the source file satisfying the user-specified variable filter configured to be used to identify variables in the source file to be transferred to the user selected destination file of the user selected destination file type;
        receive, via an interface enabling the user to specify whether variables in the source file satisfying the user-specified variable filter are to be kept in a data transfer to the user selected destination file of the user selected destination file type, an instruction to keep variables in the source file satisfying the user-specified variable filter in a data transfer to the destination file;
        at least partly in response to a user command to transfer data from the source file to the user selected destination file of the user selected destination file type, cause:
            variables, including:
                variable values and
                corresponding variable labels,
            in the source file satisfying the user-specified variable filter to be transferred to the destination file, wherein the variables in the source file satisfying the user-specified variable filter comprise a subset of variables included in the source file; and
            enable the destination file, comprising variables, including variable values and corresponding variable labels from the source file satisfying the user-specified variable filter, to be utilized by a statistical analysis program.

2. The system as defined in claim 1, wherein the system is configured to:
    provide a user interface that enables the user to specify whether an optimization process of a target type is to be performed, wherein in response to a user instruction that the optimization process of a target type is to be performed, the system selects target types so as to reduce memory utilization without losing variable value information;
    at least partly in response to the user instruction to perform an optimization process of a target type, cause an optimization is performed on target types for one or more of the variables in the source file satisfying the user-specified variable filter being transferred to the destination file, the optimization selecting a floating point precision type for at least one variable in the source file satisfying the user-specified variable filter being transferred to the destination file.

3. The system as defined in claim 1, wherein the system is configured to:
provide a user interface that enables the user to specify whether an optimization process of a target type is to be performed, wherein in response to the user instructing that the optimization process of a target type is to be performed, the system selects target types so as to reduce memory utilization;
at least partly in response to a user instruction to perform an optimization process of a target type, cause an optimization is performed on target types for one or more of the variables in the source file satisfying the user-specified variable filter being transferred to the destination file, the optimization comprising:
identifying a first variable with a double precision floating point format;
determining whether the first variable can be stored in a single precision floating point format without a loss of information; and
at least partly in response to determining that the first variable can be stored in a single precision floating point format without a loss of information,
storing the first variable in the single precision floating point format.

4. The system as defined in claim 1, wherein the system is configured to:
identify missing variables in the source file;
determine a quantity of the identified missing variables;
use the determined quantity of the identified missing variables to determine whether a first threshold is violated; and
at least partly in response to a determination that the first threshold is violated, generate an alert notification.

5. The system as defined in claim 1, wherein the system is configured to:
receive a user-specified case filter from a user via a corresponding user interface;
identify, using a search engine configured to search for cases, cases in the source file satisfying the user-specified case filter;
receive, via an interface enabling the user to specify whether cases in the source file satisfying the user-specified case filter are to be kept in a corresponding data transfer to the destination file, an instruction to keep cases in the source file satisfying the user-specified case filter in a corresponding data transfer to the destination file;
transfer the user specified cases in the source file satisfying the user-specified case filter to the destination file.

6. The system as defined in claim 1, wherein the system is configured to:
provide a user interface configured to enable the user to view all the variables in the source file;
automatically select all the variables in the source file for transfer to the destination file; and
enable the user to deselect one or more variables of the system selected variables to thereby inhibit the deselected one or more variables from being transferred to the destination file.

7. The system as defined in claim 1, wherein the system is configured to:
automatically perform case conversions on variable names in accordance with one or more rules.

8. The system as defined in claim 1, wherein the user-specified variable filter comprises one or more wildcard characters.

9. The system as defined in claim 1, wherein the input file type menu further comprises a portable document format input file type.

10. A computer-implemented method, the method comprising:
receiving, via a user input device, a selection of an input file type from an input file type menu comprising at least:
a statistical analysis program input file type menu entry, and
a spreadsheet program input file type menu entry;
receiving, via the user device, a file specification for a source file;
receiving, via the user device, a selection of a destination file type, wherein the user is enabled to specify at least a statistical analysis program destination file type or a spreadsheet program destination file type;
receiving, via the user device, a file specification for a destination file to which data from the source file is to be transferred;
receiving a user-specified variable filter from via the user device, the user-specified variable filter configured to be used to identify variables in the source file to be transferred to the destination file of the user selected destination file type;
identifying variables in the source file satisfying the user-specified variable filter configured to be used to identify variables in the source file to be transferred to the destination file of the user selected destination file type;
receiving via an interface enabling the user to specify whether variables in the source file satisfying the user-specified variable filter are to be kept in a data transfer to the destination file, an instruction to keep variables in the source file satisfying the user-specified variable filter in a data transfer to the destination file;
performing an optimization process that selects a target type for at least one variable configured to reduce memory utilization without losing variable value information, the optimization process selecting a precision type for at least one variable in the source file satisfying the user-specified variable filter being transferred to the destination file; and
transferring variables, including variable values and corresponding variable labels, in the source file satisfying the user-specified variable filter to the destination file in accordance with the optimization process; and
enabling the destination file, comprising variables, including variable values and corresponding variable labels from the source file satisfying the user-specified variable filter, to be utilized by a statistical analysis program.

11. The method as defined in claim 10, the method further comprising:
identifying missing variables in the source file;
determining a quantity of the identified missing variables;
using the determined quantity of the identified missing variables to determine whether a first threshold is violated;
at least partly in response to a determination that the first threshold is violated, generating an alert notification.

12. The method as defined in claim 10, the method further comprising, prior to performing optimization, storing numerical variable values in the source file as double precision floating point numbers.

13. The method as defined in claim 10, the method further comprising:
identifying a first variable with a double precision floating point format;
determining whether the first variable can be stored in a single precision floating point format without a loss of information; and
at least partly in response to determining that the first variable can be stored in a single precision floating point format without a loss of information,
storing the first variable in the single precision floating point format.

14. The method as defined in claim 10, the method further comprising:
receiving a user-specified case filter from a user via a corresponding user interface;
identifying cases in the source file satisfying the user-specified case filter;
receiving via an interface enabling the user to specify whether cases in the source file satisfying the user-specified case filter are to be kept in a corresponding data transfer to the destination file, an instruction to keep cases in the source file satisfying the user-specified case filter in a corresponding data transfer to the destination file; and
transferring the user specified cases in the source file satisfying the user-specified case filter to the destination file.

15. The method as defined in claim 10, the method further comprising:
providing a user interface configured to enable the user to view all the variables in the source file;
automatically selecting all the variables in the source file for transfer to the destination file; and
enabling the user to deselect one or more variables of the automatically selected variables to thereby inhibit the deselected one or more variables from being transferred to the destination file.

16. The method as defined in claim 10, the method further comprising:
automatically performing case conversions on variable names in accordance with one or more rules.

17. The method as defined in claim 10, wherein the user-specified variable filter comprises one or more wildcard characters.

18. The method as defined in claim 10, wherein the input file type menu further comprises a portable document format input file type.

19. A non-transitory computer readable medium having computer readable code stored thereon, the computer readable code, when executed by at least one processor device, causing performance of operations comprising:
receive a selection, via an interface presented via a display of a computing device, of an input file type from an input file type menu comprising at least:
a statistical analysis program input file type menu entry, and
a spreadsheet program input file type menu entry;
receive, via the interface comprising one or more user interfaces presented via the display of the computing device, a file specification for a source file, stored in memory, from which variables and variable labels are to be transferred;
receive, via the interface presented via the display of the computing device, a destination file type specification, via a destination file type user interface presented on a first display, the destination file type user interface comprising a destination file type menu including at least:
a statistical analysis program destination file type menu entry, and
a spreadsheet program destination file type menu entry;
receive, via the interface presented via the display of the computing device, a file specification for a destination file to which data from the source file is to be transferred;
receive via an interface, presented via the display of the computing device, enabling the user to specify whether variables in the source file are to be kept in a data transfer to the specified destination file, an instruction to keep user-specified variables in the source file in a data transfer to the specified destination file;
transfer user-specified variables, including variable values and corresponding variable labels, in the source file to the destination file in accordance with the instruction to keep user-specified variables in the source file in the data transfer to the destination file, wherein the destination file is stored in memory; and
enable the destination file to be accessed from memory and utilized by a statistical analysis program executed by a computer system.

20. The non-transitory computer readable medium as defined in claim 19, the operations further comprising:
perform an optimization process that selects a target type for at least one variable configured to reduce memory utilization without losing variable value information, the optimization process selecting a floating point precision type for at least one variable in the source file being transferred to the destination file.

21. The non-transitory computer readable medium as defined in claim 19, the operations further comprising:
identify missing variables in the source file;
determine a quantity of the identified missing variables;
use the determined quantity of the identified missing variables to determine whether a first threshold is violated; and
at least partly in response to a determination that the first threshold is violated, generate an alert notification.

22. The non-transitory computer readable medium as defined in claim 19, the operations further comprising, prior to performing optimization, store numerical variable values in the source file as double precision floating point numbers.

23. The non-transitory computer readable medium as defined in claim 19, the operations further comprising:
perform an optimization process, the optimization process comprising:
identify a first variable with a double precision floating point format;
determine whether the first variable can be stored in a single precision floating point format without a loss of information; and
at least partly in response to determining that the first variable can be stored in a single precision floating point format without a loss of information,
store the first variable in the single precision floating point format.

24. The non-transitory computer readable medium as defined in claim 19, the operations further comprising:
receive a user-specified case filter from a user via a corresponding user interface;
identify cases in the source file satisfying the user-specified case filter;

receive, via an interface enabling the user to specify whether cases in the source file satisfying the user-specified case filter are to be kept in a corresponding data transfer to the destination file, an instruction to keep cases in the source file satisfying the user-specified case filter in a corresponding data transfer to the destination file; and transfer the user specified cases in the source file satisfying the user-specified case filter to the destination file.

25. The non-transitory computer readable medium as defined in claim 19, the operations further comprising:

provide a user interface configured to enable the user to view all the variables in the source file;

automatically select all the variables in the source file for transfer to the destination file; and enable the user to deselect one or more variables of the automatically selected variables to thereby inhibit the deselected one or more variables from being transferred to the destination file.

26. The non-transitory computer readable medium as defined in claim 19, the operations further comprising:

automatically perform case conversions on variable names in accordance with one or more rules.

27. The non-transitory computer readable medium as defined in claim 19, the operations further comprising receiving a user-specified variable filter comprising one or more wildcard characters.

28. The non-transitory computer readable medium as defined in claim 19, wherein the input file type menu further comprises a portable document format input file type.

* * * * *